US008477351B2

(12) United States Patent
Maruyama et al.

(10) Patent No.: US 8,477,351 B2
(45) Date of Patent: Jul. 2, 2013

(54) IMAGE FORMING APPARATUS, METHOD, AND RECORDING MEDIUM FOR IMPROVING CONVENIENCE WITH RESTRICTED JOB EXECUTION

(75) Inventors: Tomoko Maruyama, Toyokawa (JP);
Masahiro Imamura, Toyokawa (JP);
Koichi Amiya, Toyokawa (JP);
Kazuhiro Tomiyasu, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 522 days.

(21) Appl. No.: 12/782,314

(22) Filed: May 18, 2010

(65) Prior Publication Data
US 2010/0296123 A1 Nov. 25, 2010

(30) Foreign Application Priority Data
May 19, 2009 (JP) .................................. 2009-121203

(51) Int. Cl.
*G06F 15/00* (2006.01)
*G06F 3/12* (2006.01)
*G06K 1/00* (2006.01)

(52) U.S. Cl.
USPC .......................................... 358/1.15; 358/1.14

(58) Field of Classification Search
None
See application file for complete search history.

(56) References Cited

U.S. PATENT DOCUMENTS

| 2001/0052995 | A1 | 12/2001 | Idehara |
| 2005/0100378 | A1 | 5/2005 | Kimura et al. |
| 2006/0077417 | A1 | 4/2006 | Nakata et al. |
| 2007/0296998 | A1 | 12/2007 | Iwamoto et al. |
| 2009/0086262 | A1* | 4/2009 | Suzuki ......................... 358/1.15 |
| 2009/0244620 | A1* | 10/2009 | Takahashi et al. ........... 358/1.15 |

FOREIGN PATENT DOCUMENTS

| JP | 8-84211 | 3/1996 |
| JP | 10-319795 | 12/1998 |
| JP | 2002-185688 | 6/2002 |
| JP | 2002-264455 | 9/2002 |
| JP | 2003-51925 | 2/2003 |
| JP | 2004-179788 | 6/2004 |
| JP | 2005-354204 | 12/2005 |
| JP | 2006-94046 | 4/2006 |
| JP | 2006-107293 | 4/2006 |
| JP | 2006-146944 | 6/2006 |
| JP | 2006-254162 | 9/2006 |
| JP | 2007-83682 | 4/2007 |
| JP | 2007-94721 | 4/2007 |
| JP | 2007-310074 | 11/2007 |
| JP | 2008-1000 | 1/2008 |
| JP | 2008-187261 | 8/2008 |

OTHER PUBLICATIONS

Notice of Grounds of Rejection mailed Jul. 10, 2012, directed to Japanese Patent Application No. 2009-121203; 11 pages.
Japanese Notice of Grounds of Rejection mailed Nov. 15, 2011, directed to Japanese Patent Application No. 2009-121203; 14 pages.
Japanese Notice of Grounds of Rejection mailed Mar. 29, 2011, directed to Japanese Application No. 2009-121203; 10 pages.

* cited by examiner

*Primary Examiner* — Douglas Tran
(74) *Attorney, Agent, or Firm* — Morrison & Foerster LLP

(57) ABSTRACT

It is determined whether the service mode is turned off. When it is determined that the service mode is turned off, the remote access job history is checked. A CPU then determines whether there is an unexecuted job. When determining that there is an unexecuted job, the CPU inquires of the PC providing an instruction to execute the job whether to re-execute the job. The CPU then determines whether an instruction to re-execute the unexecuted job has been accepted. When determining that an instruction to re-execute the unexecuted job has been accepted, the CPU re-executes the unexecuted job.

9 Claims, 23 Drawing Sheets

FIG.5

| SERVICE MODE | PRINT | SCAN | FACSIMILE | E-MAIL | DOWNLOAD |
|---|---|---|---|---|---|
| MODE A | ○ | ○ | × | × | × |
| MODE B | × | ○ | ○ | ○ | ○ |
| MODE C | ○ | × | ○ | ○ | ○ |
| ⋮ | ⋮ | ⋮ | ⋮ | ⋮ | ⋮ |

FIG.6

| JOB ID | USER ID | PC IDENTIFICATION (ADDRESS) | APPLICATION | JOB TYPE | DOCUMENT | JOB STATE | FACTOR | FUNCTION |
|---|---|---|---|---|---|---|---|---|
| 00010 | 098 | AAA¥BBB | PRINTER DRIVER | PCFax | ESTIMATE.xls | NORMALLY ENDED | | |
| 00011 | 112 | 192.168.100.112 | PRINTER DRIVER | PRINT | SCHEDULE.xls | ACCEPTANCE REJECTED | ERROR | PRINTER |
| 00012 | 014 | 192.168.100.14 | WEB APPLICATION | PRINT | Box14/MONTHLY REPORT.pdf | ACCEPTANCE REJECTED | SERVICE MODE | PRINTER |
| 00013 | 005 | 192.168.100.5 | WEB APPLICATION | PRINT | Box5/MEETING MINUTES.pdf | ACCEPTANCE REJECTED | SERVICE MODE | PRINTER |
| 00014 | 052 | CCC¥DDD | WEB APPLICATION | DOWNLOAD | Box52/FEE CHARGING.pdf | NORMALLY ENDED | | |
| ... | ... | ... | ... | ... | ... | ... | ... | ... |

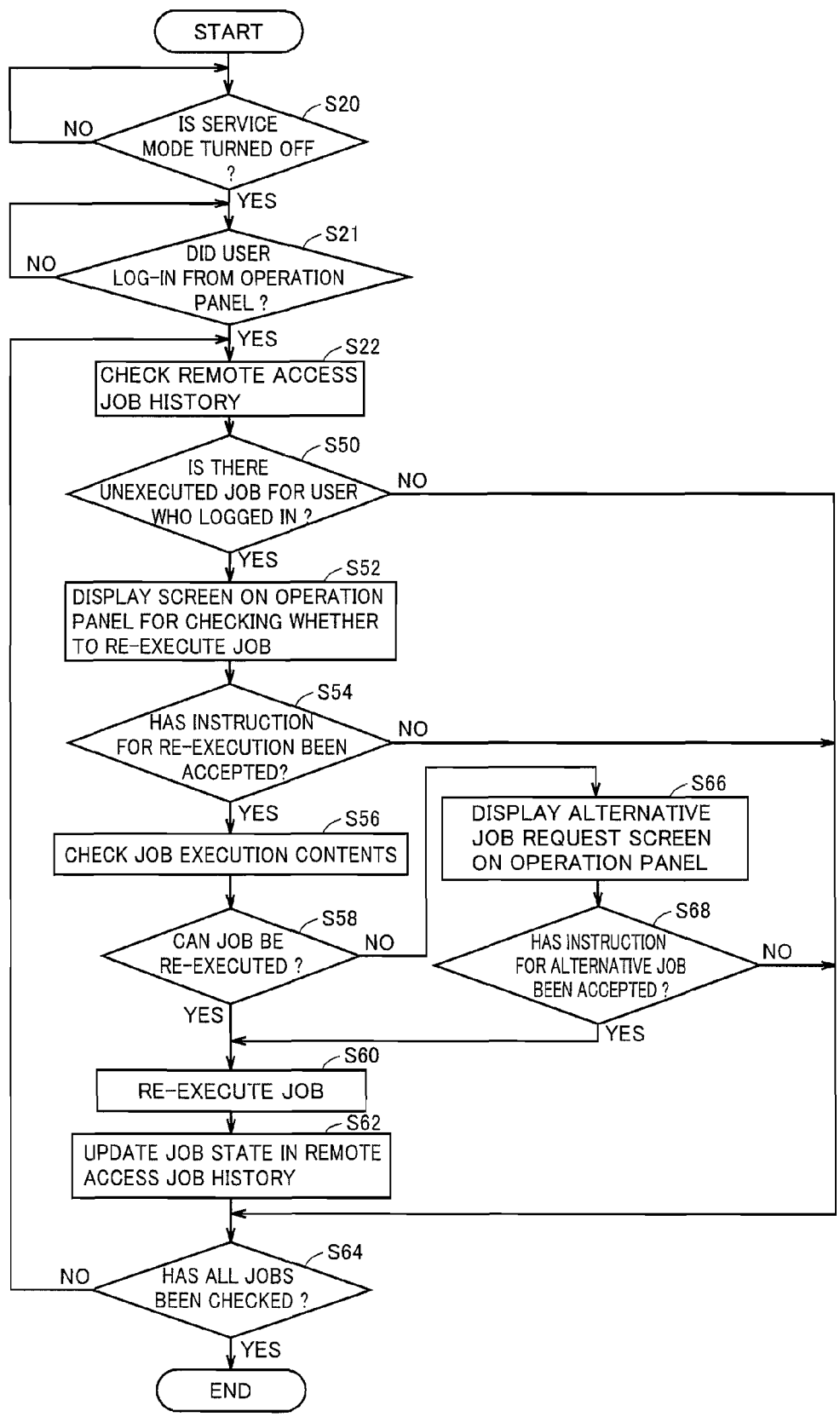

FIG.16

| UNAVAILABLE FUNCTION | LIST OF ALTERNATIVE FUNCTIONS |
|---|---|
| FACSIMILE | E-MAIL @ |
| PRINT | FACSIMILE, E-MAIL, DOWNLOAD, TRANSMIT TO ANOTHER PRINTER AND PRINT@ |
| ⋮ | ⋮ |

FIG.18

| JOB ID | USER ID | PC IDENTIFICATION (ADDRESS) | APPLICATION | JOB TYPE | DOCUMENT | JOB STATE | FACTOR | FUNCTION | ALTERNATIVE PROCESS |
|---|---|---|---|---|---|---|---|---|---|
| 00010 | 098 | AAA¥BBB | PRINTER DRIVER | PCFax | ESTIMATE.xls | NORMALLY ENDED | | | |
| 00011 | 112 | 192.168.100.112 | PRINTER DRIVER | PRINT | SCHEDULE.xls | ACCEPTANCE REJECTED | ERROR | PRINTER | |
| 00012 | 014 | 192.168.100.14 | WEB APPLICATION | PRINT | Box14/ MONTHLY REPORT.pdf | ALTERNATIVE PROCESS | SERVICE MODE | PRINTER | E-MAIL |
| 00013 | 005 | 192.168.100.5 | WEB APPLICATION | PRINT | Box5/ MEETING MINUTES.pdf | ALTERNATIVE PROCESS | SERVICE MODE | PRINTER | PRINT BY ANOTHER DEVICE |
| 00014 | 052 | CCC¥DDD | WEB APPLICATION | DOWNLOAD | Box52/ FEE CHARGING.pdf | NORMALLY ENDED | | | |
| ... | ... | ... | ... | ... | ... | ... | ... | ... | ... |

FIG.23

| JOB ID | USER ID | PC IDENTIFICATION (ADDRESS) | APPLICATION | JOB TYPE | DOCUMENT | JOB STATE | FACTOR | FUNCTION | ALTERNATIVE PROCESS |
|---|---|---|---|---|---|---|---|---|---|
| 00010 | 098 | AAA¥BBB | PRINTER DRIVER | PCFax | ESTIMATE. xls | NORMALLY ENDED | | | |
| 00011 | 112 | 192.168.100.112 | PRINTER DRIVER | PRINT | SCHEDULE. xls | ACCEPTANCE REJECTED | ERROR | PRINTER | |
| 00012 | 014 | 192.168.100.14 | WEB APPLICATION | PRINT | Box14/ MONTHLY REPORT. pdf | AUTOMATICALLY RESTART | SERVICE MODE | PRINTER | |
| 00013 | 005 | 192.168.100.5 | WEB APPLICATION | PRINT | Box5/ MEETING MINUTES. pdf | ALTERNATIVE PROCESS | SERVICE MODE | PRINTER | PRINT BY ANOTHER DEVICE |
| 00014 | 052 | CCC¥DDD | WEB APPLICATION | DOWNLOAD | Box52/ FEE CHARGING. pdf | NORMALLY ENDED | | | |
| ... | ... | ... | ... | ... | ... | ... | ... | ... | ... | ized
IMAGE FORMING APPARATUS, METHOD, AND RECORDING MEDIUM FOR IMPROVING CONVENIENCE WITH RESTRICTED JOB EXECUTION This application is based on Japanese Patent Application No. 2009-121203 filed with the Japan Patent Office on May 19, 2009, the entire content of which is hereby incorporated by reference.

BACKGROUND OF THE INVENTION

1. Field of the Invention

The present invention relates to an image forming apparatus performing data communication with an external terminal device.

2. Description of the Related Art

In recent years, since greater importance is placed on documentation, there is a need to develop an image forming apparatus capable of copying an image at a high resolution and with high quality. While this type of image forming apparatus, which originally serves to copy a monochrome image of the scanned document onto the printing paper, has been developed to provide a diversified copy functions such as a color copying function and a zooming function, and also to provide enhanced resolution and quality of the image. Furthermore, there has been a widespread use of a multifunction copier having a plurality of functions as a printer, a facsimile machine, contents service and the like in addition to a copying function.

When employing the above-described type of image forming apparatus, most of them are provided based on the lease contract, in which case a vendor counts the number of times of image formation using a billing counter to charge the usage fee to a customer.

Furthermore, in the image forming apparatus, even if its automatic concentration adjustment function is activated, the image quality varies under the influence of the environment in which the apparatus is placed (temperature, humidity and the like), the state of the supplies (fatigue of the photoreceptor), a change over time, and the like.

The electrophotographic process corresponding to the engine unit of the image forming apparatus has a complicated structure, which makes it difficult for the customer to arbitrarily make adjustments.

Accordingly, in most cases, the customer makes a contract with the vendor for maintenance performed by a customer engineer who periodically visits the place where the image forming apparatus is installed.

However, while the customer engineer (also referred to as a serviceman) performs the maintenance operation, the user's operation is sometimes not allowed since it may hinder the operation of the serviceman.

In this case, if the user can be allowed to use the functions irrelevant to the serviceman's operation, the convenience for the user may be improved.

In this regard, Japanese Laid-Open Patent Publication No. 2007-083682 discloses a method for setting a type of job which is executable in advance before the serviceman starts the maintenance operation, and, when a job request occurs during the maintenance operation, allowing execution of only the job that is set as being executable.

However, not only is the job executed through the operation on the panel of the image forming apparatus, but the job request also occurs by access from the terminal device, for example, a PC (Personal Computer), which is connected through the network to the image forming apparatus.

When the user access through the network by the remote operation causes occurrence of a job request that is unexecutable, this job request may be rejected or discarded.

In this regard, Japanese Laid-Open Patent Publication No. 2006-107293 discloses a method for storing a history of the job executed by the user to notify the user who issued instructions to execute the job that the error condition has been resolved.

Japanese Laid-Open Patent Publication No. 2006-107293 as described above discloses that notification is made when the error condition is resolved, which requires the user to start the operation again from the beginning in order to re-execute the job request, thus rendering the operation complicated.

Furthermore, when the job request is not executable, the process cannot be carried out until the maintenance operation is completed, which prevents an immediate action from being taken when the user wishes to immediately execute the job.

SUMMARY OF THE INVENTION

The present invention has been made in order to solve the above-described problems, and aims to provide an image forming apparatus which provides an improved convenience for the user even in the case where a job request that is unexecutable occurs while the executable job is restricted due to the maintenance operation or the like.

According to an example of the present embodiment, an image forming apparatus communicatively connected to an external terminal includes a communication device for transmitting and receiving data to and from the external terminal; a controller capable of providing an instruction to execute at least one function of a plurality of functions which are executable in the image forming apparatus, said at least one function having been designated in job information from the external terminal received in the communication device; and a memory storing the job information from the external terminal received in the communication device. The controller is configured to inhibit use of at least one function of the plurality of functions which are executable in the image forming apparatus in accordance with an instruction; check contents of the job information received from the external terminal; determine based on the checked job information whether the function inhibited from being used is designated; and output information used for determining whether to re-execute the function inhibited from being used which is designated in the job information, upon termination of a state where the function is inhibited from being used, when determining that the function inhibited from being used is designated.

Preferably, the controller is configured to output, to the external terminal transmitting the job information through the communication device, the information used for determining whether to re-execute the function inhibited from being used which is designated in the job information.

Particularly, the controller is configured to, when determining that the function inhibited from being used is designated, determine whether a function not inhibited from being used can be applied as an alternative to the function inhibited from being used; and, when determining that the function not inhibited from being used can be applied as an alternative to the function inhibited from being used, output, to the external terminal transmitting the job information through the communication device, information used for determining whether to execute an alternative function not inhibited from being used.

Particularly, the controller is configured to determine whether an instruction to execute the alternative function has been accepted, said instruction being transmitted from the external terminal through the communication device; instruct execution of the alternative function when the instruction to execute the alternative function has been accepted; and, when execution of the alternative function is instructed, store information that the alternative function has been executed as history information in the memory.

Particularly, the controller is configured to determine whether the history information stored in the memory includes the information that the alternative function has been executed, upon termination of the state where the function is inhibited from being used; and, in accordance with a determination result, output the information used for determining whether to re-execute the function inhibited from being used which is designated in the job information.

Preferably, the job information from the external terminal includes user information about a user transmitted from the external terminal. The image forming apparatus includes a display for displaying information and an authentication unit for performing a user authentication process in accordance with an instruction. The controller is configured to determine whether the user authentication process in the authentication unit is performed, upon termination of the state where the function is inhibited from being used; in accordance with a determination result, extract the job information designating the function inhibited from being used, said job information being stored in the memory and including the user information about the user for whom the user authentication process is performed; and output, to the display, the information used for determining whether to re-execute the function inhibited from being used which is designated in the extracted job information.

Particularly, the controller is configured to determine whether an instruction to re-execute the function inhibited from being used has been accepted in a screen displayed on the display based on the information used for determining whether to re-execute the function inhibited from being used which is designated in the extracted job information; when the instruction to re-execute the function inhibited from being used has been accepted, determine whether the function inhibited from being used which is designated in the extracted job information can be re-executed; and, when determining that the function inhibited from being used which is designated in the extracted job information cannot be re-executed, output the information used for determining an alternative process to the display.

According to an example of the present embodiment, a method for controlling an image forming apparatus is provided. The image forming apparatus communicatively connected to an external terminal includes a communication device for transmitting and receiving data to and from the external terminal; a controller capable of providing an instruction to execute at least one function of a plurality of functions which are executable, said at least one function having been designated in job information from the external terminal received in the communication device; and a memory storing the job information from the external terminal received in the communication device. The method includes the steps of: inhibiting use of at least one function of the plurality of functions which are executable in the image forming apparatus in accordance with an instruction; checking contents of the job information received from the external terminal; determining based on the checked job information whether a function inhibited from being used is designated; and outputting information used for determining whether to re-execute the function inhibited from being used which is designated in the job information, upon termination of a state where the function is inhibited from being used, when determining that the function inhibited from being used is designated.

According to an example of the present embodiment, a recording medium recording a control program executed by a computer of an image forming apparatus is provided. The image forming apparatus communicatively connected to an external terminal includes a communication device for transmitting and receiving data to and from the external terminal; a controller capable of providing an instruction to execute at least one function of a plurality of functions which are executable, said at least one function having been designated in job information from the external terminal received in the communication device; and a memory storing the job information from the external terminal received in the communication device. The control program causes the computer to perform the steps of: inhibiting use of at least one function of the plurality of functions which are executable in the image forming apparatus in accordance with an instruction; checking contents of the job information received from the external terminal; determining based on the checked job information whether a function inhibited from being used is designated; and outputting information used for determining whether to re-execute the function inhibited from being used which is designated in the job information, upon termination of a state where the function is inhibited from being used, when determining that the function inhibited from being used is designated.

The image forming apparatus according to one embodiment of the present invention outputs the information used for determining whether to re-execute the function determined as being inhibited from being used and designated in the job information, upon termination of the state where at least one function of a plurality of functions is inhibited from being used. This eliminates the need for the user to start the operation again from the beginning in order to re-execute the job request, to thereby allow simplification in providing an instruction for re-execution, which is highly convenient for the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating the executable function in the service mode according to the first embodiment of the present invention.

FIG. 6 is a diagram illustrating a list of the remote access job history according to the first embodiment of the present invention.

FIG. 10 is a flowchart illustrating job execution in the case where the service mode is turned off, according to the second embodiment of the present invention.

FIG. 16 is a diagram illustrating an alternative function correspondence table.

FIG. 18 is a diagram illustrating a list of the remote access job history according to the third embodiment of the present invention.

FIG. 23 is a diagram illustrating a list of the remote access job history according to the modification of the third embodiment of the present invention.

DESCRIPTION OF THE PREFERRED EMBODIMENTS

Figure 1:
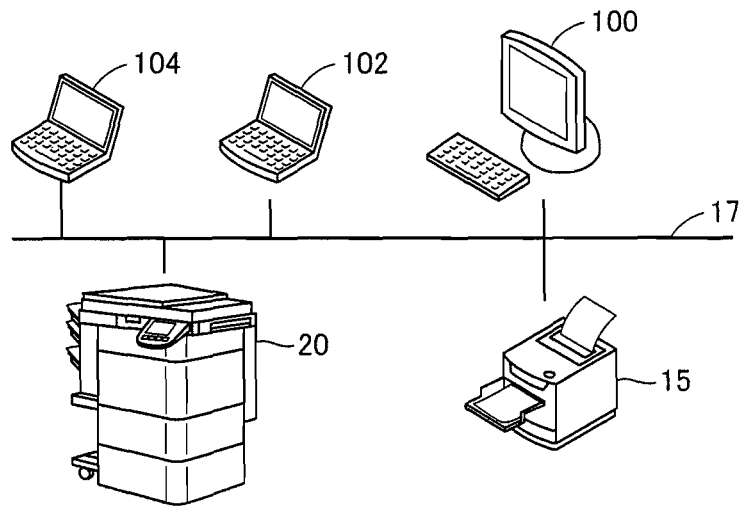
FIG. 1 is a diagram illustrating the configuration of an image forming system 1 according to the first embodiment of the present invention.

The embodiments of the present invention will be hereinafter described with reference to the accompanying drawings, in which the same or corresponding components are designated by the same reference characters. Their names and functions are also the same.

[First Embodiment]

FIG. 1 is a diagram illustrating the configuration of an image forming system 1 according to the first embodiment of the present invention.

Referring to FIG. 1, image forming system 1 according to the first embodiment of the present invention includes an MFP (Multi Function Peripheral) 20 corresponding to an image forming apparatus, a printer 15, and external PCs (Personal Computer) 100, 102, 104 each serving as an external terminal. MFP 20, printer 15 and external PCs 100, 102, 104 are connected to each other through the network to allow data communication to be established with each other. Although the configuration having three external PCs, one MFP and one printer connected via an LAN (Local Area Network) 17 will be described in the present embodiment, the number of the components is not limited to one but may be two or more. In addition, the first embodiment of the present invention may also be implemented by one external PC and one MFP. Furthermore, the network connection may be implemented by an LAN, a WAN (Wide Area Network) or the like. The connection may be wired or wireless. It is to be noted that printer 15 connected to LAN 17 is registered in advance as another printer in MFP 20, as described below.

Figure 2:
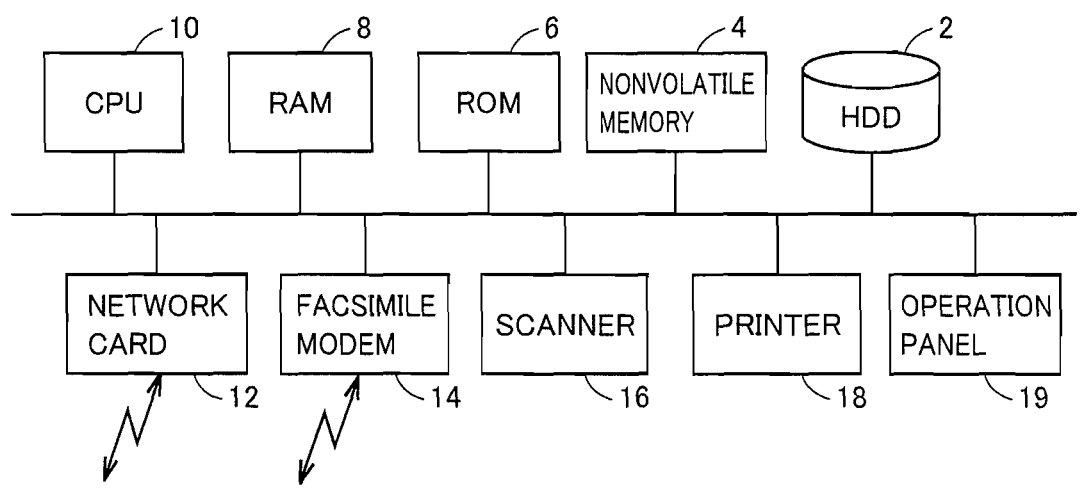
FIG. 2 is a diagram illustrating the configuration of an MFP 20 according to the first embodiment of the present invention.

FIG. 2 is a diagram illustrating the configuration of MFP 20 according to the first embodiment of the present invention.

Referring to FIG. 2, MFP 20 according to the first embodiment of the present invention includes a CPU (Central Processing Unit) 10 for executing various types of programs including an operating system (OS); a RAM 8 temporarily storing the data required for executing the program by CPU 10; a hard disk drive (HDD) 2 and a nonvolatile memory 4 storing the program and data in a nonvolatile manner which are executed by CPU 10; a ROM 6 in which the program executed by CPU 10 is stored in advance; an operation panel 19 used for performing each operation; a scanner 16 scanning a document to obtain image data, a printer 18 printing the image data onto a paper medium, a facsimile modem 14 for performing facsimile communication; and a network card 12 including a LAN card and the like for establishing data communication with the outside. Operation panel 19 includes a display unit, a key input unit, and the like. Furthermore, the above-described units are connected through an internal bus to each other for allowing transmission and reception of the data to and from each other.

Furthermore, in the present embodiment, a serviceman can switch MFP 20 from the normal mode to the service mode in order to perform the maintenance operation. Specifically, the serviceman can switch MFP 20 to the service mode by entering a predetermined service code, for example, using operation panel 19. In the present embodiment, several types of service modes are set which are different in function that is designated as being unexecutable. The serviceman enters the service code in accordance with the contents carried out in the maintenance operation, to render the function corresponding to the part to be maintained unexecutable so as to allow an smooth operation, and also to render the function corresponding to the part irrespective of the maintenance operation executable so as to provide improved convenience for the user.

Figure 3:
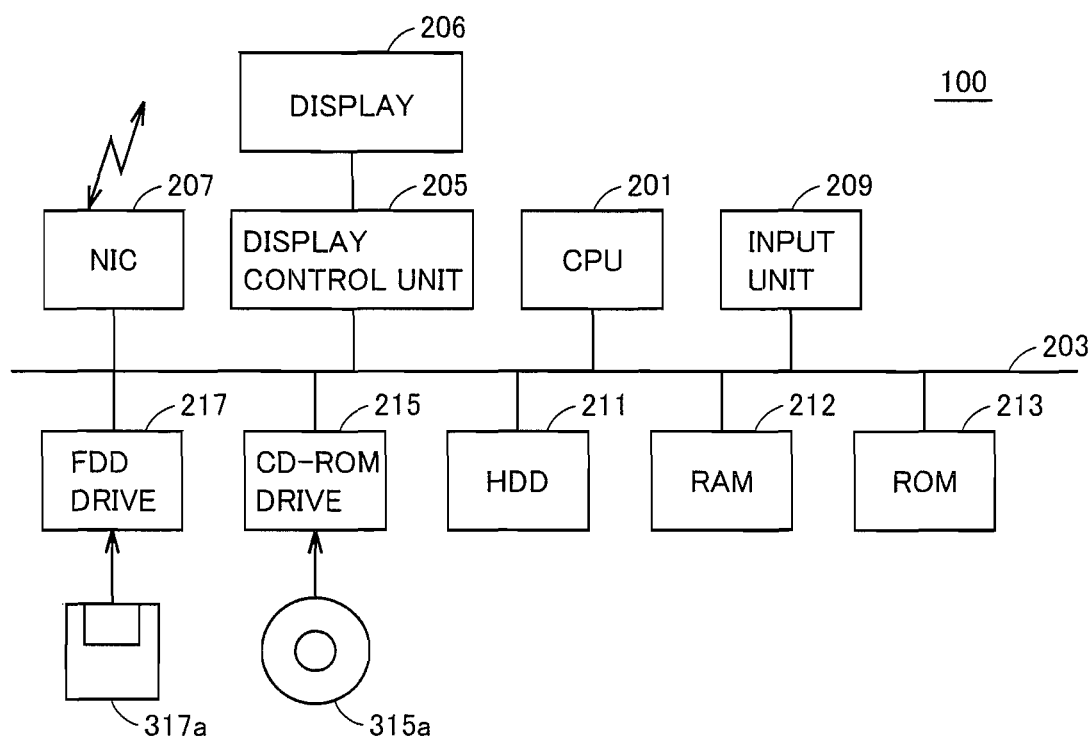
FIG. 3 is a diagram illustrating the configuration of a PC according to the first embodiment of the present invention.

FIG. 3 is a diagram illustrating the configuration of the PC according to the first embodiment of the present invention.

Referring to FIG. 3, PC 100 according to the first embodiment of the present invention includes a CPU (Central Processing Unit) 201 executing various types of programs including an operating system (OS); a RAM 212 temporarily storing the data required for executing the program by CPU 201; a hard disk drive (HDD) 211 storing the program executed by CPU 201 in a nonvolatile manner; and an ROM 213 in which the program executed by CPU 201 is stored in advance.

Furthermore, ROM 213 has the software program stored therein which is used for instructing MFP 20 to execute various jobs. External PC 100 can obtain the IP address set to MFP 20 to access MFP 20. For example, PC 100 is provided with a web browser (web application) used for obtaining, for example, the information on MFP 20.

External PC 100 can refer to MFP 20 through the web browser for checking the apparatus setting and also can obtain the document data stored in MFP 20.

Alternatively, external PC 100 can print the data stored in MFP 20, or can transmit the image data to MFP 20 using the printer driver installed in the external PC. That is, external PC 100 can transmit the print job for providing an instruction to execute the printing process in MFP 20.

The above-described program is read by an FD drive 217 or a CD-ROM (compact disc-read only memory) drive 215 from a flexible disk 317a or a CD-ROM 315a, respectively.

CPU 201 receives an instruction from the user through an input unit 209 including a keyboard, a mouse, and the like, and outputs the screen output generated by executing the program through a display control unit 205 to a display 206.

Furthermore, CPU 201 transmits a job and the like to MFP 20 connected to the LAN or WAN through a network interface card (NIC) unit 207 including a LAN card and the like. The above-described units transmit and receive the data to and from each other through an internal bus 203. Since PCs 102 and 104 each have the same configuration as that described above, the description thereof will not be repeated. In addition, although the configuration having display 206 integrally provided in the PC body has been described in the present embodiment, the configuration is particularly not limited thereto, but display 206 may be separately provided.

The process in which PC 100 issues each type of job request (hereinafter also referred to as a remote access job) to MFP 20 will be hereinafter described.

Figure 4:
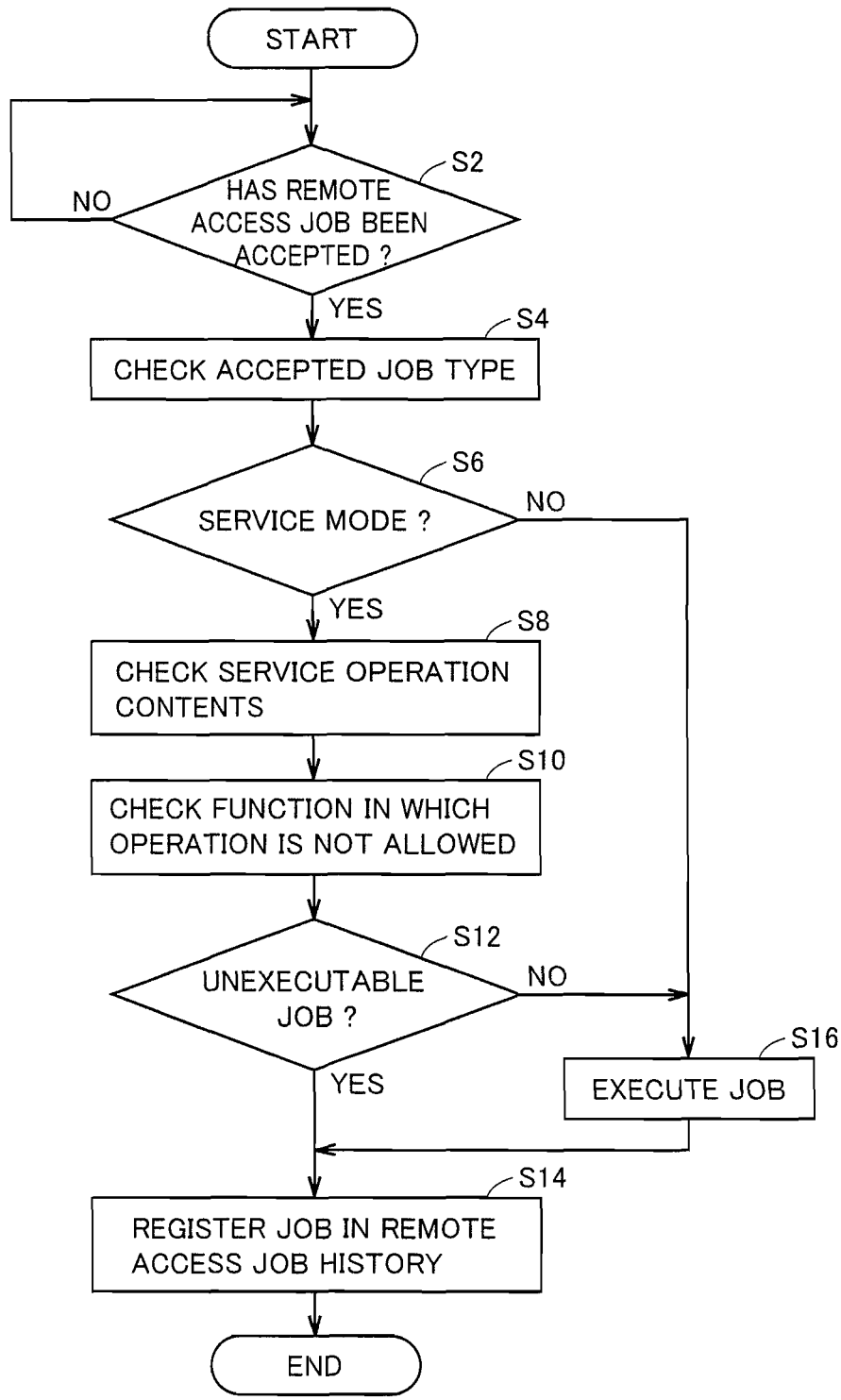
FIG. 4 is a flowchart illustrating the process in MFP 20 in the case where the remote access job is accepted, according to the first embodiment of the present invention.

FIG. 4 is a flowchart illustrating the process in MFP 20 in the case where the remote access job is accepted, according to the first embodiment of the present invention.

Referring to FIG. 4, it is determined whether the remote access job has been accepted or not (step S2). Specifically, CPU 10 in MFP 20 determines whether the remote access job has been accepted from PC 100 through network card 12. When the remote access job has been accepted from the PC, the job data is stored in RAM 8 of MFP 20.

In step S2, when it is determined that the remote access job has been accepted, the type of the accepted job is checked (step S4). Specifically, for example, based on the header information included in the job data, CPU 10 checks whether the job is a print job or another type of job.

Then, it is determined whether the service mode is applied (step S6).

Specifically, CPU 10 determines whether MFP 20 is currently in the service mode (step S6).

FIG. 5 is a diagram illustrating the executable function in the service mode according to the first embodiment of the present invention.

Referring to FIG. 5, three types of service modes are shown by way of example, in which modes A, B and C are shown, for example. The service code is set corresponding to each mode. The serviceman can enter the service code using operation panel 19 for setting to any of the modes.

In mode A, the print and scan jobs are executable (represented by a symbol "o" in FIG. 5) while the facsimile, e-mail and download jobs are unexecutable (represented by a symbol "x" in FIG. 5).

In mode B, the print job is unexecutable while the scan, facsimile, e-mail, and download jobs are executable.

In mode C, the print, facsimile, e-mail, and download jobs are executable while the scan job is unexecutable.

Although three types of service modes have been described by way of example, the service mode is not limited thereto, but a plurality of combinations of modes may be set.

Referring back to FIG. 4, when determining in step S6 that the service mode is applied (YES in step S6), CPU 10 checks the contents of the service operation (step S8). Specifically, CPU 10 determines which mode described above in FIG. 5 is applied.

Then, CPU 10 checks the function (module) in which an operation is not allowed (step S10).

Specifically, CPU 10 checks which function cannot be executed in accordance with the above-described modes. For example, in mode A, the facsimile, e-mail and download jobs cannot be executed.

CPU 10 then determines whether the accepted job is unexecutable (step S12).

In step S12, when determining that the accepted job is unexecutable (YES in step S12), CPU 10 registers the job in the remote access job history without executing the accepted job (step S14). Specifically, CPU 10 registers the job state as "acceptance rejected" in the remote access job history. In this case, factors causing the rejection, functions that cannot be executed and the like are also registered. In addition, the remote access job history is stored in HDD 2, nonvolatile memory 4 or RAM 8.

The process then ends (end).

On the other hand, it is determined in step S6 that the service mode is not applied, in which case the normal mode is applied. Accordingly, the accepted job is executed (step S16). For example, in the case of the print job, the image data is printed in printer 18.

In step S12, when the accepted job is not an unexecutable job, the accepted job is executed (step S16).

The process then proceeds to step S14 in which the job is registered in the remote access job history. Specifically, CPU 201 registers the job state as "normally ended" in the remote access job history.

Then, the process ends (end).

FIG. 6 is a diagram illustrating a list of the remote access job history according to the first embodiment of the present invention.

FIG. 6 shows the case where a job ID (identification) is allocated to every accepted job in ascending order. The present embodiment shows job IDs of "00010" to "00014" by way of example.

A user ID set in advance corresponding to the user having issued a job request, PC identification information (address) of the external PC having issued a job request to MFP 20, application used for generating a job, a job type, a document name, and a job state are shown corresponding to each job ID. Furthermore, a factor preventing the job from being normally ended and a function which could not be executed are shown.

In the present embodiment, the figure shows the case where the job ID is designated as "00010", the user ID is designated as "098", the address is designated as "AAA¥BBB", the application is designated as "printer driver", the job type is designated as "PCFax", the document name is designated as "estimate.xls", and the job state is designated as "normally ended", by way of example.

The figure also shows the case where the job ID is designated as "00011", the user ID is designated as "112", the address is designated as "192.168.100.112", the application is designated as "printer driver", the job type is designated as "print", the document name is designated as "schedule.xls", the job state is designated as "acceptance rejected", the factor is designated as "error", and the function is designated as "printer".

The figure also shows the case where the job ID is designated as "00012", the user ID is designated as "014", the address is designated as "192.168.100.14", the application is designated as "web application", the job type is designated as "print", the document name is designated as "box14/monthly report.pdf", the job state is designated as "acceptance rejected", the factor is designated as "service mode", and the function is designated as "printer".

The figure also shows the case where the job ID is designated as "00013", the user ID is designated as "005", the address is designated as "192.168.100.5", the application is designated as "web application", the job type is designated as "print", the document name is designated as "box5/meeting minutes.pdf", the job state is designated as "acceptance rejected", the factor is designated as "service mode", and the function is designated as "printer".

The figure also shows the case where the job ID is designated as "00014", the user ID is designated as "052", the address is designated as "CCC¥DDD", the application is designated as "web application", the job type is designated as "download", the document name is designated as "box52/fee charging.pdf", and the job state is designated as "normally ended".

It is to be noted that "box14/monthly report.pdf" represents a "monthly report.pdf" file stored in the storage area having a box named as Box14 to which the box number corresponding to the user ID is allocated. The same applies to other cases.

FIG. 6 shows that acceptance of the remote access job of each job ID "00011", "00012" and "00013" is rejected.

Figure 7:
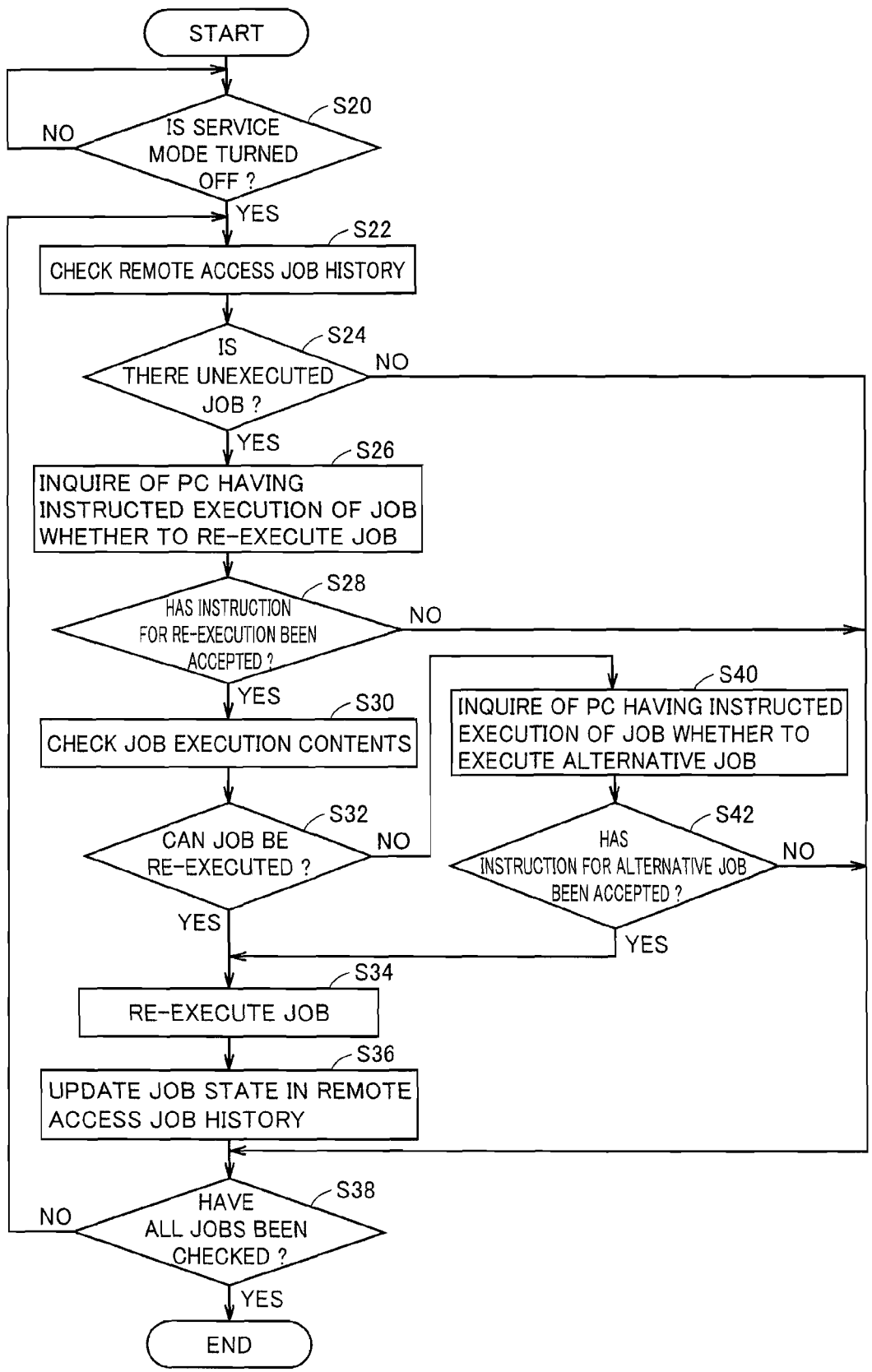
FIG. 7 is a flowchart illustrating job execution in the case where the service mode is turned off.

FIG. 7 is a flowchart illustrating job execution in the case where the service mode is turned off.

Referring to FIG. 7, it is determined whether the service mode has been turned off (step S20).

Specifically, after completion of the maintenance operation by the serviceman, CPU 10 determines whether MFP 20 is switched from the service mode to the normal mode.

When determining that the service mode has been turned off, CPU 10 then checks the remote access job history (step S22).

Specifically, CPU 10 checks the list of the remote access job history described in FIG. 6.

CPU 10 then determines whether there is an unexecuted job (step S24).

Specifically, CPU 10 determines whether the list of the remote access job history includes an unexecuted job having the job history in which the job state is designated as "acceptance rejected" and the factor is designated as "service mode". In addition, when the factor is designated not as "service mode" but as "error", there is a possibility that the job could not be normally accepted. In this case, this job is not counted as an unexecuted job.

When determining that there is an unexecuted job (YES in step S24), CPU 10 inquires of the PC having instructed execution of the job whether to re-execute the job (step S26).

Specifically, CPU 10 outputs information used for determining whether to re-execute the job to the PC having the PC identification (address) stored in the remote access job history via network card 12. In the present embodiment, PC 100 is notified of the information by way of example.

PC 100 having received the information displays a re-execution notification screen on display 206.

Figure 8:
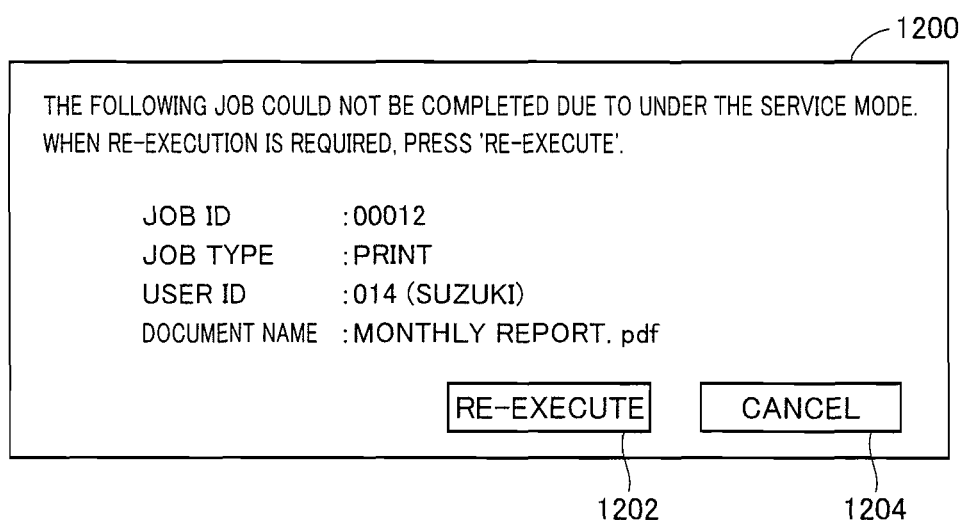
FIG. 8 is a diagram illustrating a re-execution notification screen 1200 displayed on a display 206 of PC 100 according to the first embodiment.

FIG. 8 is a diagram illustrating a re-execution notification screen 1200 displayed on display 206 of PC 100 according to the first embodiment.

Referring to FIG. 8, re-execution notification screen 1200 displays a message saying that "The following job could not be completed due to under the service mode. When re-execution is required, press 're-execute'", and also displays a job ID as "00012", a job type as "print", a user ID as "014" and a document name as "monthly report.pdf".

The figure also shows a "re-execute" button 1202 for instructing re-execution and a "cancel" button 1204 for canceling re-execution.

The user checks the re-execution notification screen displayed on display 206 of PC 100, to designate "re-execute" button 1202 or "cancel" button 1204, for example, by a mouse or the like which is a pointing device serving as an input unit.

PC 100 issues a re-execution instruction to MFP 20 in accordance with the user's designation.

The above-described re-execution notification screen can eliminate the need for the user to start the operation again from the beginning in order to re-execute the job request, which allows simplification in providing an instruction for re-execution.

For example, in the case where re-execution of the job is not required, such as the case where the job has already been executed by another MFP or the like, designation of "cancel" button 1204 allows cancellation of re-execution of the job. This allows elimination of unnecessary process, to thereby provide improved convenience for the user.

Referring back to FIG. 7, CPU 10 determines whether an instruction to re-execute the unexecuted job has been accepted (step S28). Specifically, CPU 10 determines whether a re-execution instruction has been provided from PC 100 through network card 12.

When determining that an instruction to re-execute the unexecuted job has been accepted (YES in step S28), CPU 10 checks the contents of job execution (step S30).

Specifically, CPU 10 checks the job type of the unexecuted job included in the list of the remote access job history.

CPU 10 then determines whether the unexecuted job which has been checked can be re-executed (step S32).

When determining that the job can be re-executed (YES in step S32), CPU 10 re-executes the unexecuted job (step S34). For example, in the above-described embodiment, when an instruction is given to re-execute the job having a job ID designated as "00012", a job type designated as "print", a user ID designated as "014", and a document name designated as "monthly report.pdf", the process of printing the "monthly report.pdf" is performed.

CPU 10 then updates the job state in the remote access job history (step S36).

Specifically, CPU 10 updates the job state in the remote access job history as "normally ended".

CPU 10 then determines whether all jobs have been checked in the list of the remote access job history (step S38).

When determining that all jobs have been checked in the list of the remote access job history (YES in step S38), CPU 10 ends the process (end).

On the other hand, when CPU 10 determines that all jobs have not been checked in the list of the remote access job history (NO in step S38), the process is returned to step S22.

Furthermore, when CPU 10 determines that an unexecuted job does not exist in the list of the remote access job history (NO in step S24), the process proceeds to step S38.

Furthermore, in step S28, when CPU 10 determines that an instruction to re-execute the unexecuted job has not been accepted (NO in step S28), the process proceeds to step S38.

Furthermore, in step S32, when determining that the job cannot be re-executed (NO in step S32), CPU 10 inquires of the PC having instructed execution of the job whether to execute an alternative job (step S40).

Specifically, CPU 10 outputs information used for determining whether to execute the alternative job to the PC having PC identification (address) stored in the remote access job history through network card 12. In the present embodiment, PC 100 is notified of the information by way of example.

It may be considered that the case where the unexecuted job cannot be re-executed after the service mode is turned off includes the case where, for example, the address book and the like having the transmission destination and the like of the data recorded therein is updated by the maintenance operation in the service mode.

Figure 9A:
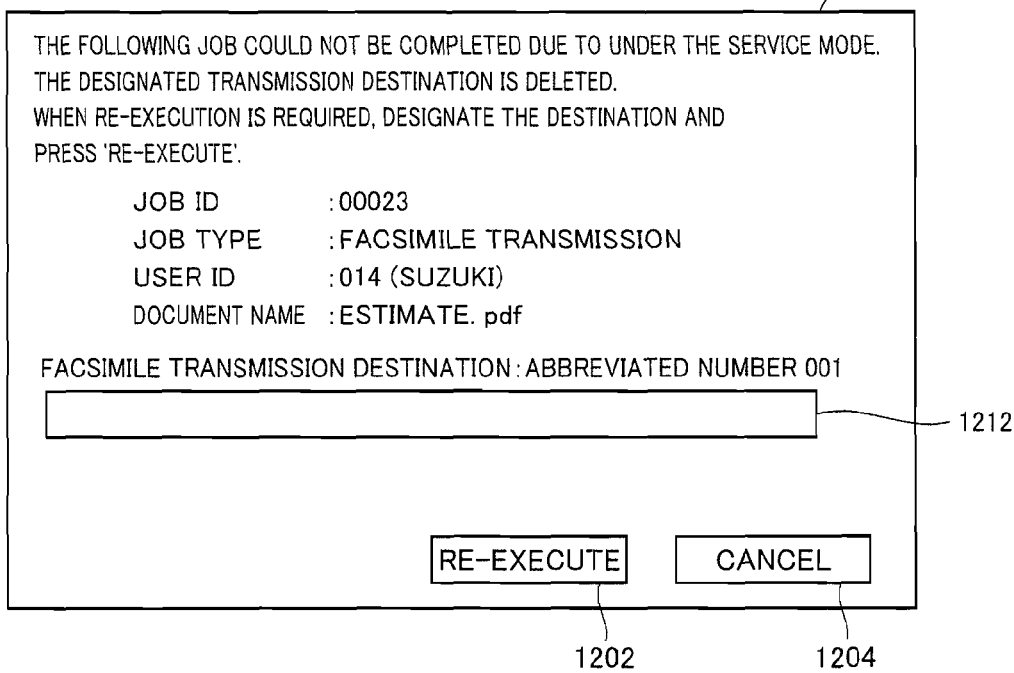
FIGS. 9A and 9B each are a diagram illustrating an alternative job request notification screen displayed on display 206 of PC 100.

FIG. 9A is a diagram illustrating an alternative job request notification screen displayed on display 206 of PC 100 according to the first embodiment.

Referring to FIG. 9A, an alternative job request notification screen 1210 displays a message saying that "The following job could not be completed due to under the service mode. The designated transmission destination is deleted. When re-execution is required, designate the destination and press 're-execute'", and also displays a job ID as "00023", a job type as "facsimile transmission", a user ID as "014" and a document name as "estimate.pdf".

The figure also shows the case where an abbreviated number "001" is designated as a facsimile transmission destination. In other words, there may be a case where, although the abbreviated number "001" is designated as a facsimile transmission destination, the facsimile number corresponding to the abbreviated number "001" has been deleted, for example, due to update of the address book having the transmission destination of the data and the like recorded therein by the maintenance operation in the service mode.

In FIG. 9A, an input column 1212 is further provided so as to allow the user to enter the facsimile number corresponding to the destination of facsimile transmission, for example, by using a keyboard or the like serving as an input unit.

The figure also shows a "re-execute" button 1202 for instructing re-execution and a "cancel" button 1204 for canceling re-execution.

The user checks the alternative job request notification screen displayed on display 206 in PC 100, and again enters the destination of facsimile transmission into input column 1212, to designate "re-execute" button 1202, for example, by using a mouse or the like serving as a pointing device corresponding to an input unit.

Alternatively, for example, the mouse or the like is used to designate "cancel" button 1204 to cancel the alternative job.

Even when the job request cannot be re-executed, for example, due to deletion of the transmission destination and the like, the alternative job request notification screen allows re-execution of the job by issuing a request to the user for an alternative job. In other words, the user can provide an instruction for re-execution in a simple manner without having to start the operation again from the beginning in order to re-execute the job request.

Referring back to FIG. 7, CPU 10 determines whether an instruction for the alternative job has been accepted (step S42).

In step S42, when determining that an instruction for the alternative job has been accepted (YES in step S42), CPU 10 re-executes the job (step S34). For example, in the above-described embodiment, when an instruction is given to re-execute the job having a job ID designated as "00023", a job type designated as "facsimile transmission", a user ID designated as "014", and a document name designated as "estimate.pdf", CPU 10 performs the process of facsimile transmission of "estimate.pdf" to the destination designated by the alternative job through facsimile modem 14.

On the other hand, when CPU 10 determines in step S42 that an instruction for the alternative job has not been accepted (NO in step S42), the process proceeds to step S38.

In accordance with the structure according to the first embodiment of the present invention, the notification screen regarding re-execution of the unexecuted job is displayed on display 206 of PC 100, which eliminates the need for the user to start the operation again from the beginning in order to re-execute the job request, to thereby allow simplification in providing an instruction for re-execution.

Furthermore, in the case where the unexecuted job cannot be re-executed, the alternative job request notification screen showing the destination and the like is displayed on display 206 of PC 100. This allows the user to readily re-execute the job request by entering the destination and the like again, to thereby allow the user to issue a re-execution instruction in a simple manner without having to start the operation again from the beginning.

Furthermore, when re-execution of the job is not required, the notification screen regarding re-execution of the unexecuted job or the alternative job request notification screen is displayed on display 206 of PC 100, to designate "cancel" button 1204, to thereby allow cancellation of re-execution of the job. This allows elimination of unnecessary process to thereby provide improved convenience for the user.

Furthermore, although alternative job request notification screen 1210 used for the user to enter the facsimile number corresponding to the destination of facsimile transmission has been set forth in the above description, there may be a case where, for example, only the facsimile number corresponding to the abbreviated number has been deleted but the e-mail address associated with the abbreviated number has been registered.

Figure 9B:
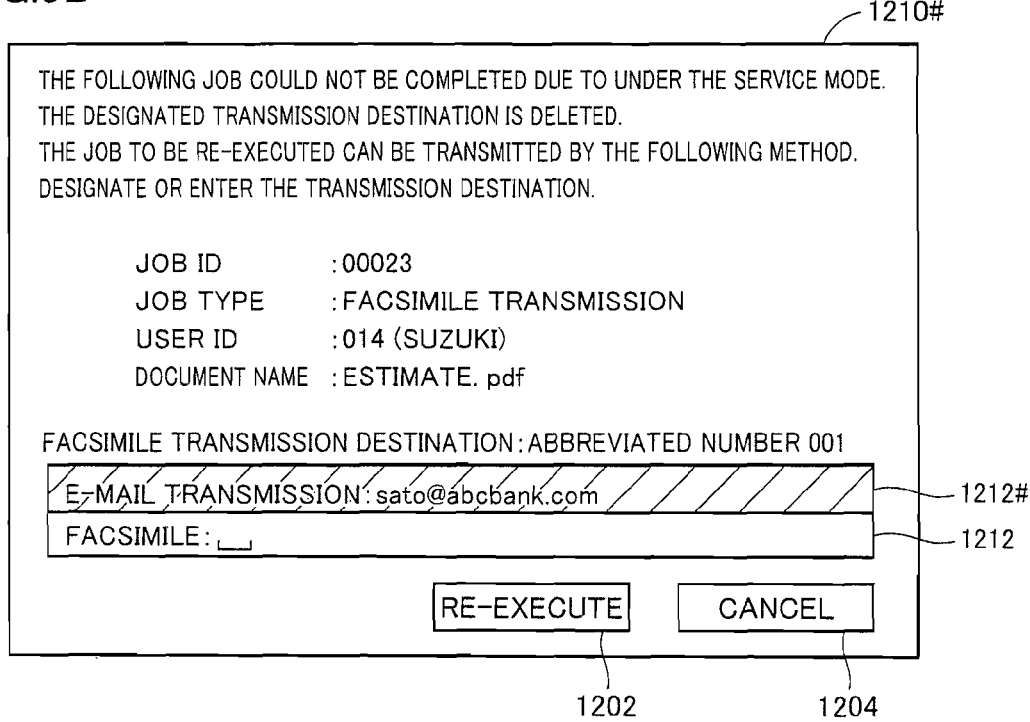

FIG. 9B is a diagram illustrating an alternative job request notification screen 1210# displayed on display 206 of PC 100 according to the first embodiment.

FIG. 9B is different from FIG. 9A showing alternative job request notification screen 1210 in that a selection column 1212# is displayed so as to allow selection of the e-mail address, in addition to input column 1212. The configuration in FIG. 9B other than the above is basically the same as alternative job request notification screen 1210 in FIG. 9A.

FIG. 9B shows a message saying that "The following job could not be completed due to under the service mode. The designated transmission destination is deleted. The unexecuted job can be re-executed by the following method. Designate or enter the transmission destination", and also displays a job ID as "00023", a job type as "facsimile transmission", a user ID as "014", and a document name as "estimate.pdf".

The user checks alternative job request notification screen 1210# displayed on display 206 of PC 100, to designate the selection column in which an e-mail address is designated as a transmission destination, for example, by using a mouse or the like. The user then selects re-execute button 1202 to perform the process of e-mail transmission of "estimate.pdf" to the e-mail address corresponding to the designated transmission destination.

The above-described alternative job request notification screen allows re-execution of the job by requesting the user to perform the alternative job based on the associated information, for example, even when the transmission destination and the like have been deleted to prevent re-execution of the job. The above-described structure allows re-execution of the job in a simpler manner. For example, in the present embodiment, designation of the e-mail address associated with the abbreviated number can eliminate the need to enter the facsimile transmission destination again, which allows simplification in re-executing the job. In addition, although the description has been made in the present embodiment by way of example with regard to the case where the alternative job can be carried out as to the e-mail address associated with the abbreviated number, the present invention is not limited thereto, but other means may be provided as a matter of course.

[Second Embodiment]

In the first embodiment as described above, the description has been made with regard to the process of the remote access job from the PC serving as an external terminal in which the PC serving as an external terminal is inquired whether to re-execute the job when the service mode is turned off.

In the second embodiment of the present invention, the description will be made with regard to the process of the remote access job from the PC serving as an external terminal in which the user accesses from MFP 20 when the service mode is turned off.

FIG. 10 is a flowchart illustrating job execution in the case where the service mode is turned off, according to the second embodiment of the present invention.

Referring to FIG. 10, it is determined whether the service mode is turned off (step S20).

Specifically, after completion of the maintenance operation by the serviceman, CPU 10 determines whether MFP 20 is switched from the service mode to the normal mode.

When determining that the service mode is turned off, CPU 10 determines whether the user logs in from the operation panel (step S21).

Figure 11:
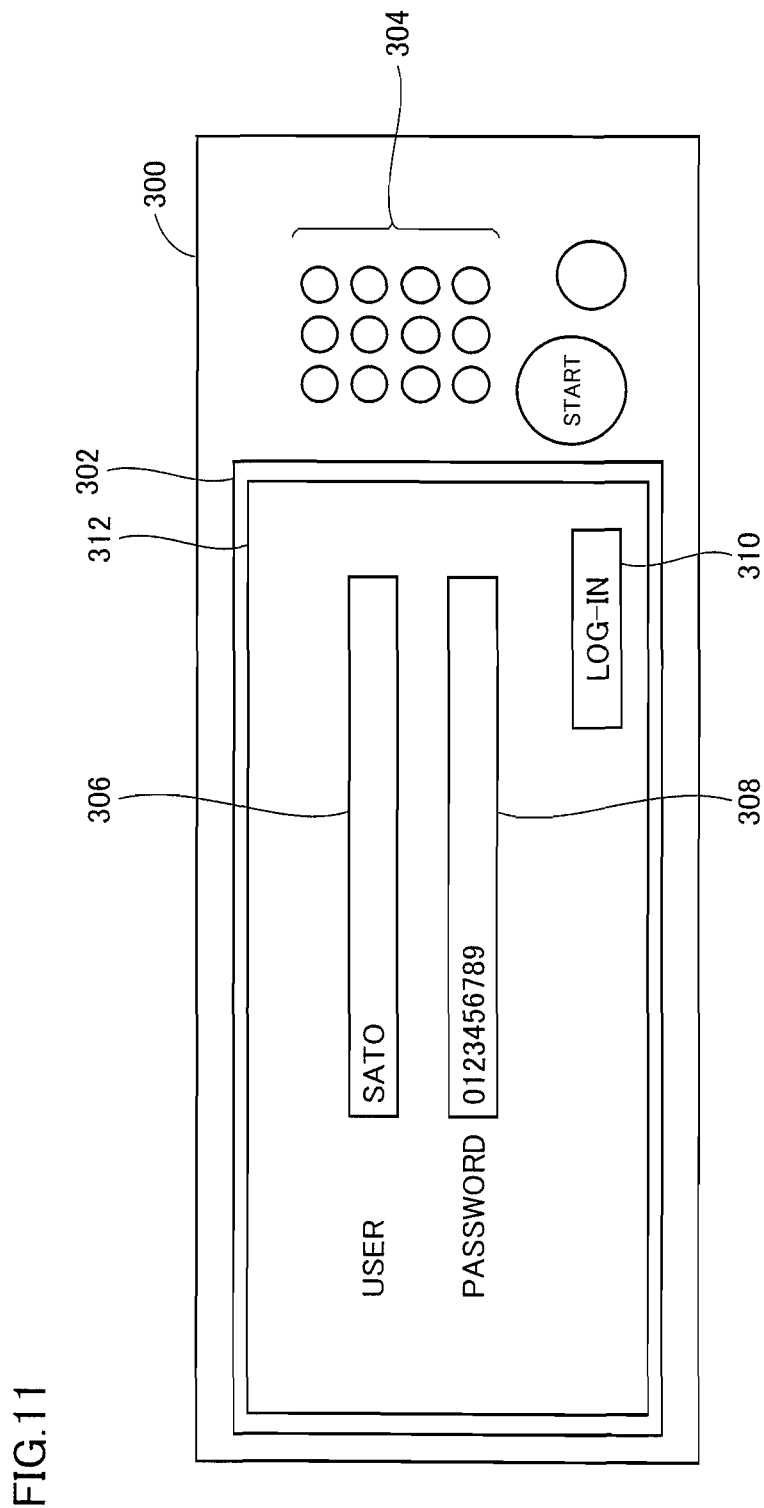
FIG. 11 is a diagram illustrating a log-in screen of an operation panel 19.

FIG. 11 is a diagram illustrating a log-in screen of operation panel 19.

FIG. 11 shows a panel area 300 including a display area 302 and a key input area 304. Display area 302 is provided with a touch panel touched by the user's finger to allow entry into the designated area.

Display area 302 includes a log-in screen 312 having an area 306 into which the user name is entered and an area 308 into which the password is entered, through which the user name and the password designated in advance are entered, respectively, to execute the authentication process. In this case, the user name "Sato" and the password "0123456789" are entered.

When a "log-in" button 310 is pressed, the authentication process is performed.

When authentication succeeds in the authentication process, that is, login is successful, it becomes possible to execute each job through the operation screen displayed on panel area 300.

Referring back to FIG. 10, when determining that login is successful, CPU 10 checks the remote access job history (step S22).

CPU 10 then determines whether there is an unexecuted job for the user who logged in (step S50).

Specifically, CPU 10 determines whether the list of the remote access job history includes an unexecuted job of the job history having the job state designated as "acceptance rejected" and the factor designated as "service mode" among the job history corresponding to the user who logged in. When the factor is designated not as "service mode" but as "error", there is a possibility that the job could not be normally accepted. This job is not counted as an unexecuted job.

When determining that there is an unexecuted job (YES in step S50), CPU 10 displays a screen on operation panel 19 for checking whether to re-execute the job (step S52).

Figure 12:
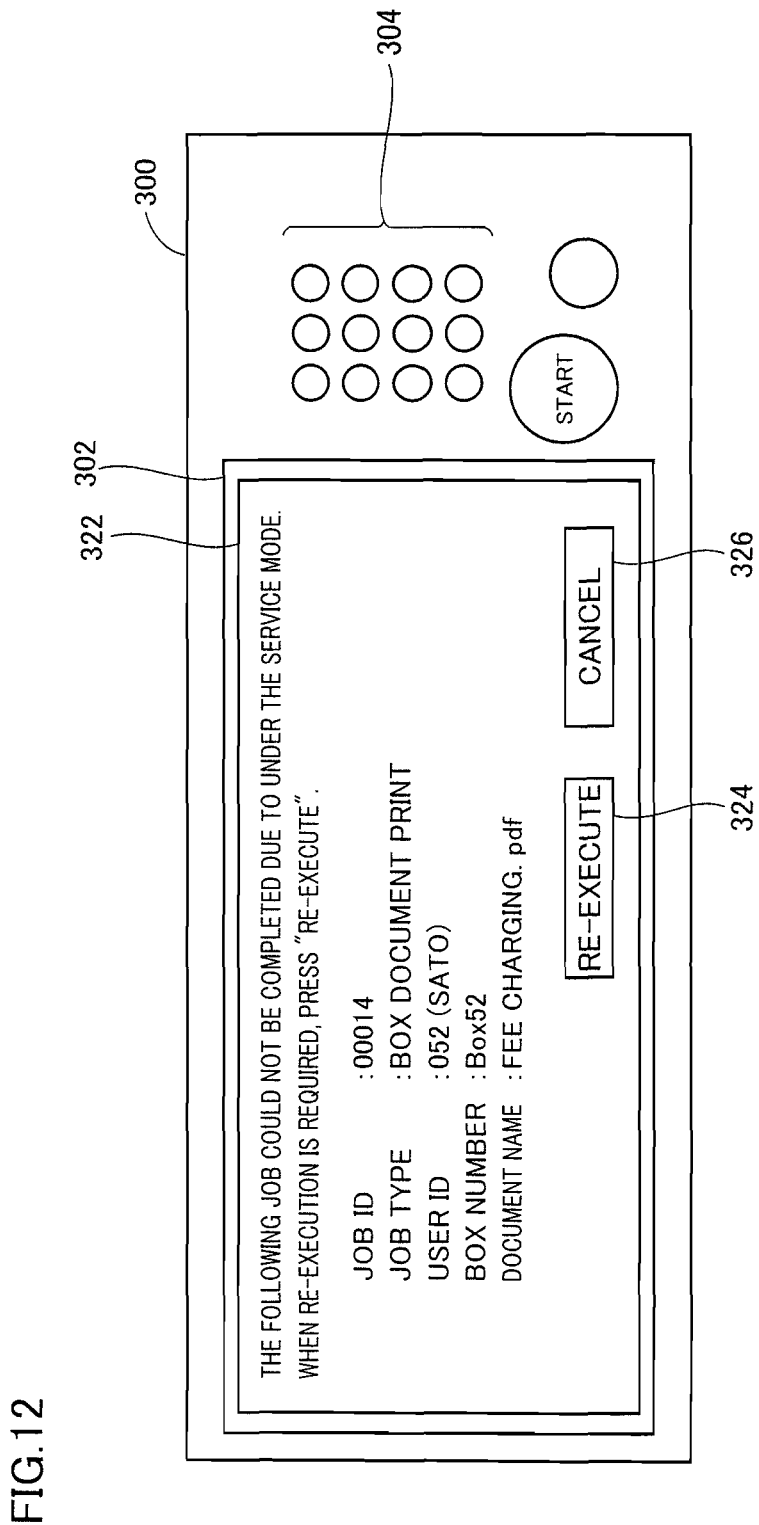
FIG. 12 is a diagram illustrating a re-execution notification screen 322 displayed on a display area 302 of a panel area 300 according to the second embodiment.

FIG. 12 is a diagram illustrating a re-execution notification screen 322 displayed on display area 302 of panel area 300 according to the second embodiment.

Referring to FIG. 12, re-execution notification screen 322 displays a message saying that "The following job could not be completed due to under the service mode. When re-execution is required, press 're-execute'", and also displays a job ID as "00014", a job type as "box document print", a user ID as "052 (Sato)", a box name as "Box52", and a document name as "fee charging.pdf".

The figure also shows a "re-execute" button 324 for instructing re-execution and a "cancel" button 326 for canceling re-execution.

The user checks the re-execution notification screen displayed on display area 302 in operation panel 19, to designate "re-execute" button 324 or "cancel" button 326 via the touch panel.

The notification screen eliminates the need for the user to start the operation again from the beginning in order to re-execute the job request, which allows simplification in providing an instruction for re-execution.

In addition, for example, in the case where re-execution of the job is not required, such as the case where the job has already been executed by another MFP and the like, designation of "cancel" button 326 allows cancellation of re-execution of the job, which allows elimination of unnecessary process to thereby provide improved convenience for the user.

Referring back to FIG. 10, CPU 10 determines whether an instruction to re-execute the unexecuted job has been accepted (step S54).

When determining that an instruction to re-execute the unexecuted job has been accepted (YES in step S54), CPU 10 checks the contents of job execution (step S56). Specifically, CPU 10 checks the job type of the unexecuted job included in the list of the remote access job history corresponding to the user who logged in.

CPU 10 then determines whether the unexecuted job which has been checked can be re-executed (step S58).

When determining that the job can be re-executed (YES in step S58), CPU 10 re-executes the unexecuted job (step S60). For example, in the above-described embodiment, when an instruction is given to re-execute the job having a job ID designated as "00014", a job type designated as "box document print", a user ID designated as "052 (Sato)", a box name designated as "Box52", and a document name designated as "fee charging.pdf", the process of printing "fee charging.pdf" stored in Box52 is executed.

CPU 10 then updates the job state in the remote access job history (step S62).

Specifically, CPU 10 updates the job state in the remote access job history as "normally ended".

CPU 10 then determines whether all jobs have been checked in the list of the remote access job history (step S64).

When determining that all jobs have been checked in the list of the remote access job history (YES in step S64), CPU 10 ends the process (end).

On the other hand, when CPU 10 determines that all jobs have not been checked in the list of the remote access job history (NO in step S64), the process is returned to step S22.

Furthermore, when CPU 10 determines that there is no unexecuted job for the user who logged in (NO in step S50), the process proceeds to step S64.

Furthermore, when CPU 10 determines in step S54 that an instruction to re-execute the unexecuted job for the user who logged in has not been accepted (NO in step S54), the process proceeds to step S64.

Furthermore, when determining in step S58 that the job cannot be re-executed (NO in step S58), CPU 10 causes operation panel 19 to display an alternative job request screen (step S66).

It may be considered that the case where the unexecuted job cannot be re-executed after the service mode is turned off as described above includes the case where, for example, the address book and the like having the transmission destination and the like of the data recorded therein is updated by the maintenance operation in the service mode.

Figure 13:
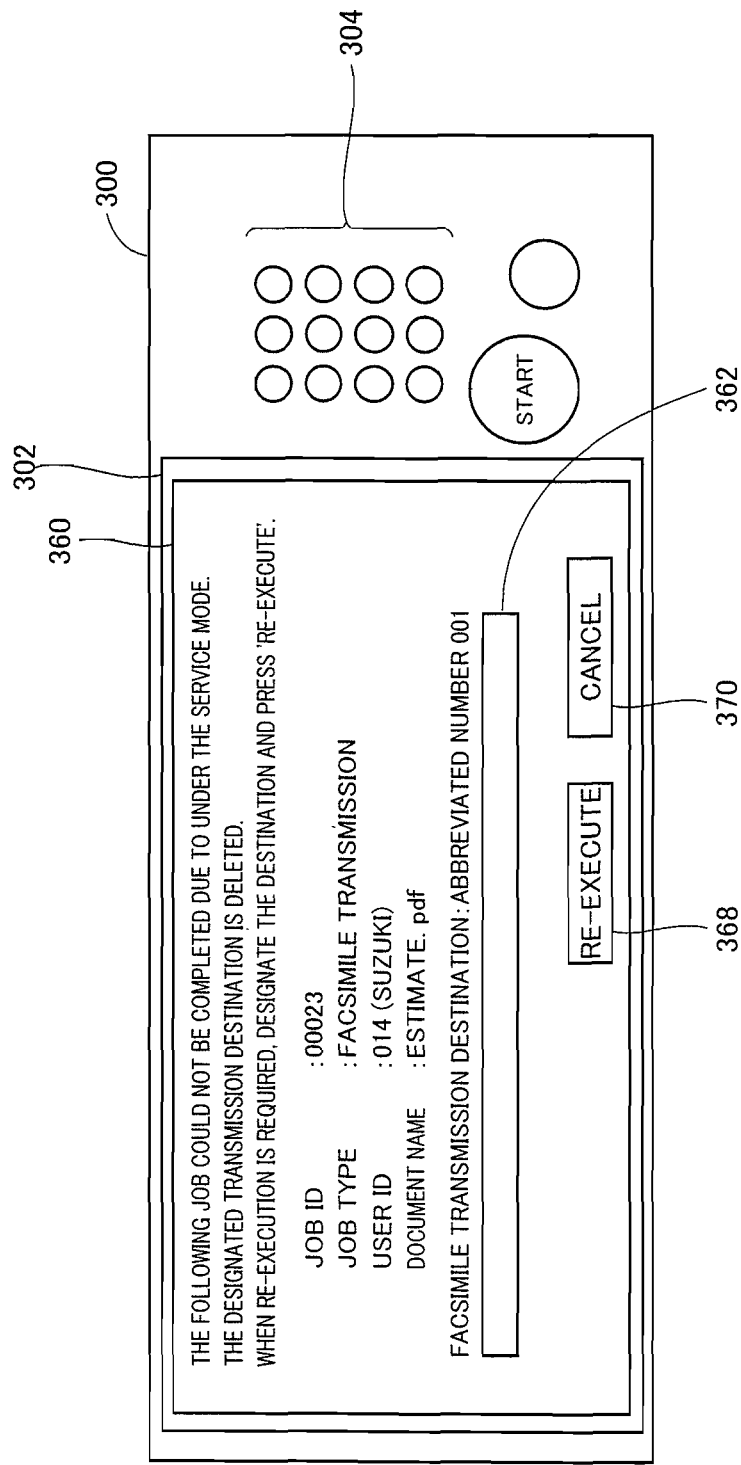
FIG. 13 is a diagram illustrating an alternative job request notification screen 360 displayed on display area 302 of panel area 300 according to the second embodiment.

FIG. 13 is a diagram illustrating an alternative job request notification screen 360 displayed on display area 302 of panel area 300 according to the second embodiment.

Referring to FIG. 13, alternative job request notification screen 360 displays a message saying that "The following job could not be completed due to under the service mode. The designated transmission destination is deleted. When re-execution is required, designate the destination and press 're-execute'", and also displays a job ID as "00023", a job type as "facsimile transmission", a user ID as "014 (Suzuki)" and a document name as "estimate.pdf".

The figure also shows the case where an abbreviated number "001" is designated as a facsimile transmission destination. In other words, there may be a case where, although the abbreviated number "001" is designated as a facsimile transmission destination, the facsimile number corresponding to the abbreviated number "001" has been deleted, for example, due to update of the address book and the like having the transmission destination and the like of the data recorded therein by the maintenance operation in the service mode.

In FIG. 13, an input column 362 is further provided so as to allow the user to enter the facsimile number corresponding to the destination of facsimile transmission, for example, with keystrokes.

The figure also shows a "re-execute" button 368 for instructing re-execution and a "cancel" button 370 for canceling re-execution.

The user checks the alternative job request notification screen displayed on display area 302 in panel area 300, and again enters the destination of facsimile transmission into input column 362, to designate "re-execute" button 368 via the touch panel.

Alternatively, "cancel" button 370 is designated via the touch panel to cancel the alternative job.

Even when the job request cannot be re-executed, for example, due to deletion of the transmission destination and the like, the alternative job request notification screen allows re-execution of the job by issuing a request to the user for an alternative job. In other words, the user can provide an instruction to re-execute the job in a simple manner without having to start the operation again from the beginning in order to re-execute the job request.

Referring back to FIG. 10, CPU 10 determines whether an instruction for an alternative job has been accepted (step S68).

In step S68, when determining that an instruction for an alternative job has been accepted (YES in step S68), CPU 10 re-executes the job (step S60). For example, in the above-described embodiment, when an instruction is given to re-execute the job having a job ID designated as "00023", a job type designated as "facsimile transmission", a user ID designated as "014", and a document name designated as "estimate.pdf", CPU 10 performs the process of facsimile transmission of "estimate.pdf" to the destination designated by the alternative job through facsimile modem 14.

On the other hand, when CPU 10 determines in step S68 that an instruction for an alternative job has not been accepted (NO in step S68), the process proceeds to step S64.

In accordance with the structure according to the second embodiment of the present invention, the notification screen regarding re-execution of the unexecuted job is displayed on display area 302 in panel area 300, which eliminates the need for the user to start the operation again from the beginning in order to re-execute the job request, to thereby allow simplification in providing an instruction for re-execution.

Furthermore, in the case where the unexecuted job cannot be re-executed, the alternative job request notification screen showing the destination and the like is displayed on display area 302 in panel area 300. This allows the user to readily re-execute the job request by entering the destination and the like, to thereby allow simplification in providing an instruction for re-execution without having to start the operation again from the beginning.

[Modification of Second Embodiment]

In the second embodiment as described above, the description has been made with regard to the structure for re-executing the job by entering the facsimile number again in alternative job request notification screen 360, for example, when the facsimile transmission destination is deleted.

It is also convenient for the user if the job having a different function can be selected instead of the job having the same function.

Figure 14:
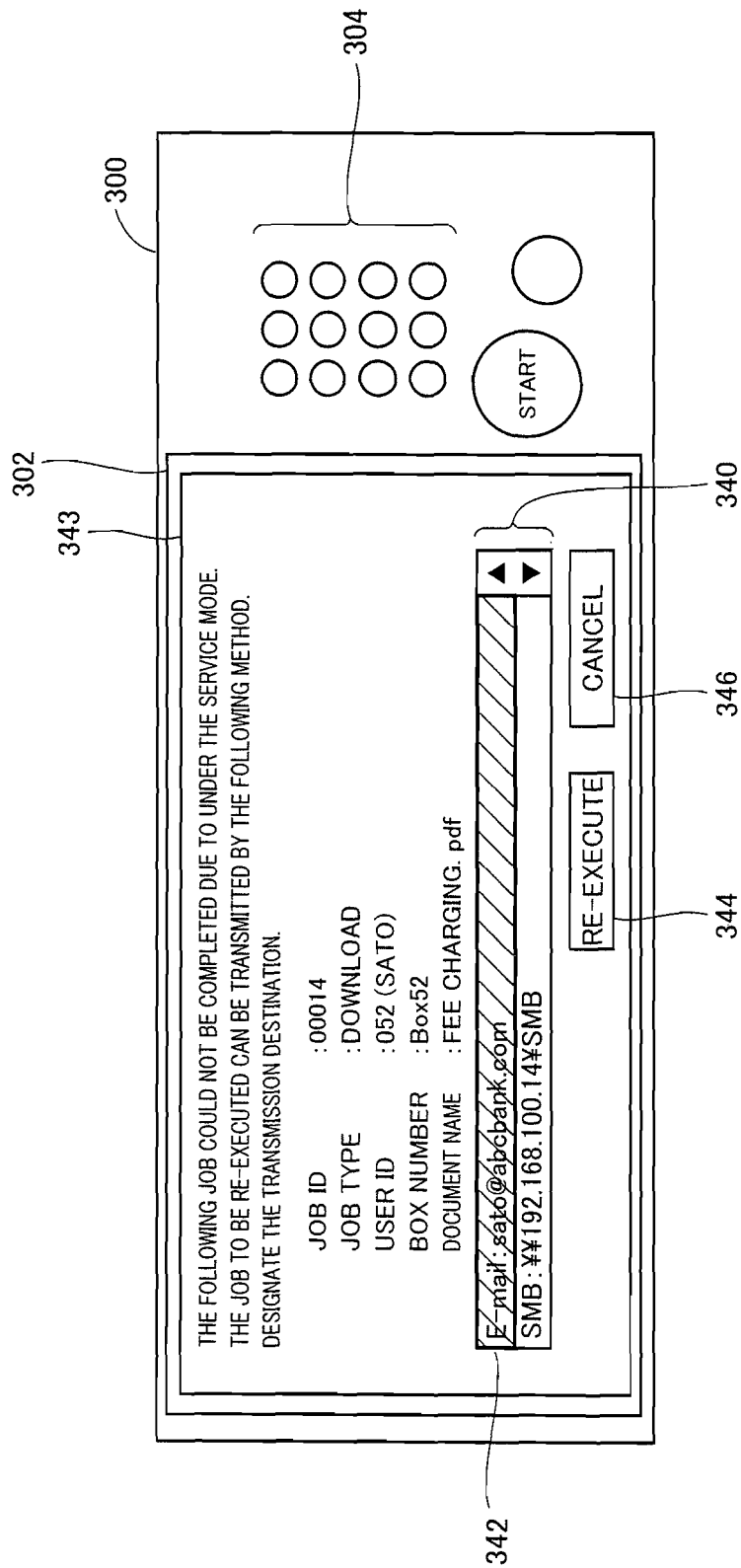
FIG. 14 is a diagram illustrating an alternative job request notification screen 343 displayed on display area 302 of panel area 300 according to the modification of the second embodiment.

FIG. 14 is a diagram illustrating an alternative job request notification screen 343 displayed on display area 302 of panel area 300 according to the modification of the second embodiment.

Referring to FIG. 14, alternative job request notification screen 343 displays a message saying that "The following job could not be completed due to under the service mode. The unexecuted job can be re-executed by the following method. Designate the transmission destination", and also displays a job ID as "00014", a job type as "download", a user ID as "052 (Sato)", a box name as "Box52", and a document name as "fee charging.pdf".

A processing mode selection area column 340 is provided which shows, by way of example, an e-mail address and an SMB (server message block) address displayed so as to be selectable in the present embodiment. The figure shows that the e-mail address is designated by way of example.

It is convenient for the user if it is possible to designate, as a job type, SMB transmission or e-mail transmission which is designated using operation panel 19 in MFP 20, in place of "download" corresponding to the remote access job executed by using PC 100. In other words, when the user looks at operation panel 19 in MFP 20 to learn that the job requested by PC 100 to be executed (to download a document "fee charging.pdf") was not executed, the user can obtain the document "fee charging.pdf" via e-mail transmission or SMB transmission by operating MFP 20 without having to go back to PC 100 to provide an instruction to execute the job again.

The figure also shows a "re-execute" button 344 for instructing re-execution and a "cancel" button 346 for canceling re-execution.

The user checks alternative job request notification screen 343 displayed on display area 302 in operation panel 19, to designate "re-execute" button 344 or "cancel" button 346 via the touch panel.

The notification screen allows the user to re-execute the process by changing the job request to a different one, which provides improved convenience for the user.

Although e-mail transmission and SMB transmission each have been cited as an example for the selectable job type in the present embodiment, FTP (File Transfer Protocol) transmission or other transmission methods may be applied.

Furthermore, it may also be possible that the job having a different function can be selected instead of the job having the similar function. For example, the print process is set to be executable in the above-described embodiment, which is highly convenient for the user.

Although the alternative job request notification screen displayed on display area 302 of the operation panel in MFP 20 has been described in the second embodiment, the screen may also be displayed on display 206 of PC 100 described in the first embodiment.

[Third Embodiment]

In the first and the second embodiments as described above, the structure for re-executing an unexecuted job after the service mode is turned off has been described.

According to the third embodiment, a structure for rendering the job executable by another alternative function in the service mode will be hereinafter described.

Figure 15:
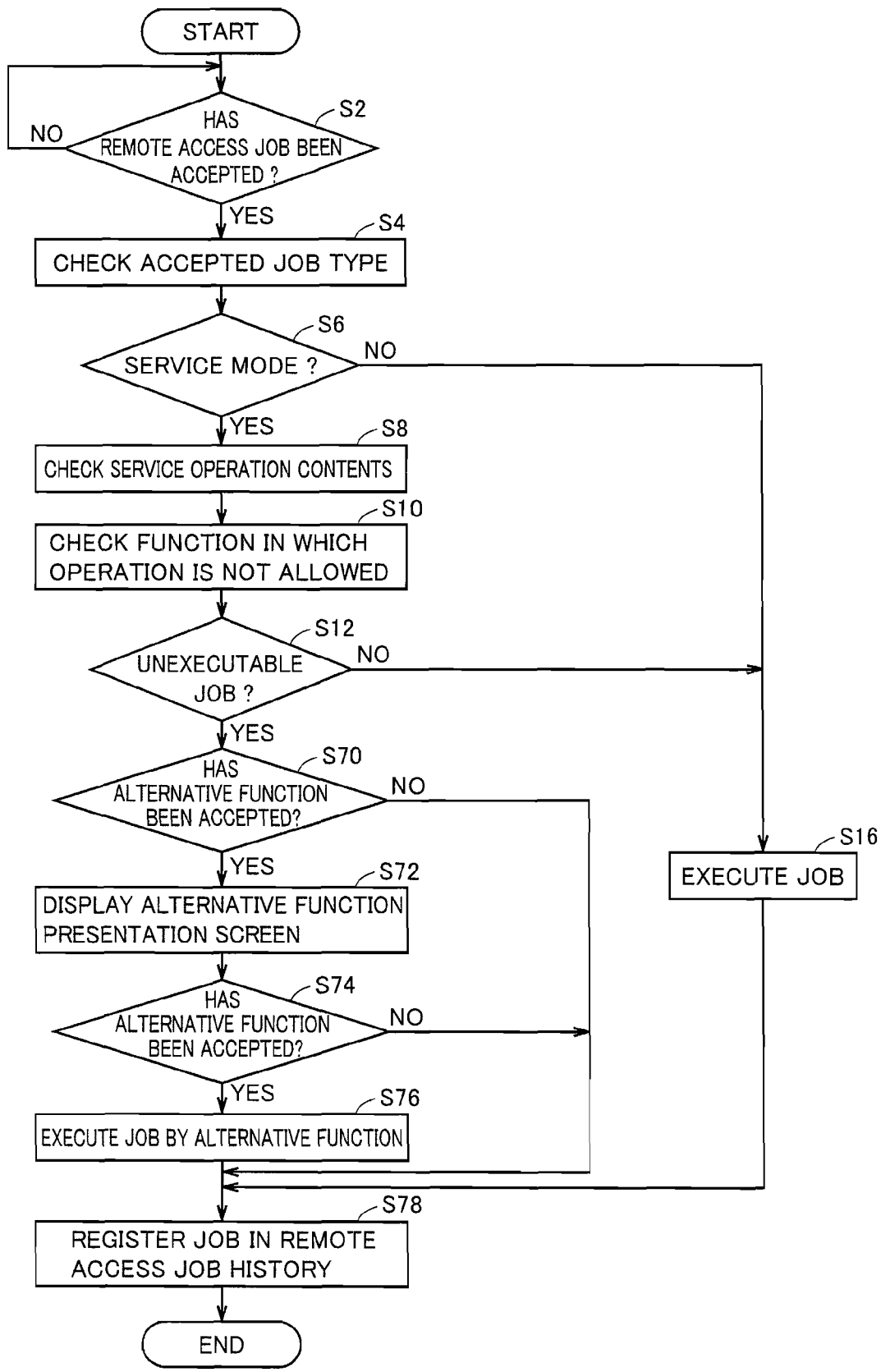
FIG. 15 is a flowchart illustrating the process in the case where the remote access job has been accepted, according to the third embodiment of the present invention.

FIG. 15 is a flowchart illustrating the process in the case where the remote access job has been accepted, according to the third embodiment of the present invention.

Referring to FIG. 15, the processes in step S12 or later are different from those described in FIG. 4.

Specifically, when determining in step S12 that the job is unexecutable (YES in step S12), CPU 10 determines whether the alternative function is available (step S70). Specifically, when determining that the job is unexecutable, CPU 10 determines whether the alternative function corresponding to the accepted job is available. Specifically, CPU 10 determines whether the corresponding alternative function registered in the alternative function correspondence table is available.

FIG. 16 is a diagram illustrating the alternative function correspondence table.

Referring to FIG. 16, a list of alternative functions corresponding to their respective unavailable functions is shown.

For example, when a facsimile job is not available, an e-mail job is registered as an alternative function.

Furthermore, when a print job is not available, a facsimile job, an e-mail job, a download job, and a "transmit to another printer and print" job each are registered as an alternative function.

Although the alternative function used in the case where a facsimile job and a print job are not available has been described in the present embodiment, the present invention is not limited thereto, but an alternative function is registered for each of other unavailable functions.

In the present embodiment, it is assumed that the function indicated by a symbol "@" is equivalent to an alternative function corresponding to the unavailable function.

Specifically, the figure shows the case where, when the facsimile job is unavailable, an e-mail job is registered as an equivalent alternative function.

Furthermore, the figure shows the case where, when the print job is unavailable, a "transmit to another printer and print" job is registered as an equivalent alternative function.

It is to be noted that the information indicating whether the alternative function is equivalent or not is used for determining whether to inquire of the PC whether to re-execute the job.

Referring back to FIG. 15, when determining in step S70 that the alternative function is available (YES in step S70), CPU 10 displays an alternative function presentation screen (step S72).

Figure 17:
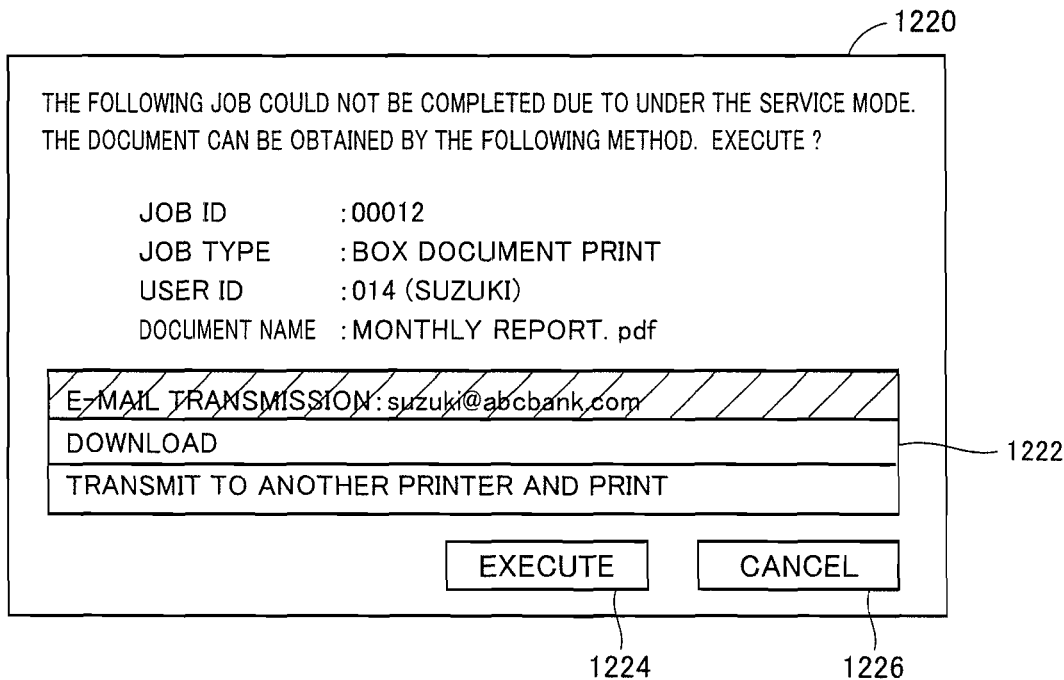
FIG. 17 is a diagram illustrating an alternative function presentation screen 1220 displayed on display 206 of PC 100.

FIG. 17 is a diagram illustrating an alternative function presentation screen 1220 displayed on display 206 of PC 100.

Referring to FIG. 17, alternative function presentation screen 1220 displays a message saying that "The following job could not be completed due to under the service mode. The document can be obtained by the following method. Execute ?", and also displays a job ID as "00012", a job type as "box document print", a user ID as "014 (Suzuki)", and a document name as "monthly report.pdf".

A selection candidate area column 1222 displays messages including "e-mail transmission (suzuki@abcbank.com)", "download" and "transmit to another printer and print" so as to be selectable.

The figure also shows an "execute" button 1224 for instructing execution and a "cancel" button 1226 for canceling execution.

The user checks alternative function presentation screen 1220 displayed on display 206 of PC 100, and selects one alternative function from selection candidates to designate "execute" button 1224 or "cancel" button 1226, for example, by a mouse or the like which is a pointing device serving as an input unit.

PC 100 outputs a job request by the alternative function to MFP 20 in accordance with the user's designation.

It is to be noted that the alternative function may be presented in arbitrary order or may be readily selectable in such a manner that the function indicated by "@" described in FIG. 16 is presented at the top.

Referring back to FIG. 15, CPU 10 determines whether an instruction to execute the alternative function has been accepted (step S74).

Specifically, CPU 10 determines whether a job request of the alternative function has been provided from PC 100 through network card 12.

When determining in step S74 that the alternative function has been accepted (YES in step S74), CPU 10 executes the job by the alternative function (step S76).

For example, in the above-described embodiment, when the e-mail transmission process is performed in the alternative function presentation screen for the job having a job ID as "00012", a job type as "box document print", a user ID as "014", and a document name as "monthly report.pdf", the process of e-mail transmission of "monthly report.pdf" to the designated destination "suzuki@abcbank.com" is performed.

Alternatively, in the above-described embodiment, when the "transmit to another printer and print" job is carried out in the alternative function presentation screen for the job having a job ID as "00012", a job type as "box document print", a user ID as "014", and a document name as "monthly report.pdf", CPU 10 transmits a print job to another printer. Specifically, in the present embodiment, printer 15 connected to LAN 17 shown in FIG. 1 is registered as another printer by way of example. CPU 10 transmits the print job to printer 15 through network card 12. Then, printer 15 performs the process of printing "monthly report.pdf".

CPU 10 then registers a job in the remote access job history (step S78). Specifically, CPU 10 registers a job state as an alternative process in the remote access job history. In this case, a factor causing the alternative process, an unexecutable function, contents of the alternative process, and the like are also registered. The remote access job history is stored in HDD 2, nonvolatile memory 4 or RAM 8. For example, when the e-mail transmission is performed as an alternative process, "e-mail" is registered as contents of the alternative process. Furthermore, in the above-described embodiment, when the "transmit to another printer and print" job is performed as an alternative process, "print by another device" is registered as contents of the alternative process.

The process then ends (end).

On the other hand, when determining in step S70 that the alternative function is unavailable (NO in step S70) or when determining in step S74 that the alternative function has not been accepted (NO in step S74), CPU 10 proceeds to step S78 without performing the alternative process. In this case, CPU 10 registers the job state as "acceptance rejected" in the remote access job history. In this case, the factor causing the rejection, the unexecutable function and the like are also registered. The process then ends (end).

Furthermore, when determining in step S12 that the designated job is not unexecutable (NO in step S12), CPU 10 executes the designated job (step S16). Then, the process proceeds to step S78.

Furthermore, it is determined in step S6 that the service mode is not applied, in which case the normal mode is applied. Accordingly, the designated job is executed (step S16). Then, the process proceeds to step S78. For example, in the case of the print job, the image data is printed in printer 18.

In step S78, CPU 10 registers the job in the remote access job history. Specifically, CPU 201 registers the job state as "normally ended" in the remote access job history.

FIG. 18 is a diagram illustrating a list of the remote access job history according to the third embodiment of the present invention.

The list of the history in FIG. 18 is different from that in FIG. 6 in that an alternative process column is additionally provided.

The figure also shows the case where a job ID is designated as "00012", a user ID is designated as "014", an address is designated as "192.168.100.14", an application is designated as "web application", a job type is designated as "print", a document name is designated as "box14/monthly report-.pdf", a job state is designated as "alternative process", a factor is designated as "service mode", a function is designated as "printer", and a content of the alternative process is designated as "e-mail".

Furthermore, the figure also shows the case where a job ID is designated as "00013", a user ID is designated as "005", an address is designated as "192.168.100.5", an application is designated as "web application", a job type is designated as "print", a document name is designated as "box5/meeting minutes.pdf", a job state is designated as "alternative process", a factor is designated as "service mode", a function is designated as "printer", and a content of the alternative process is designated as "print by another device".

The configuration other than the above is the same.

Thus, FIG. 18 shows that each remote access job having job IDs "00012" and "00013" is subjected to an alternative process.

Figure 19:
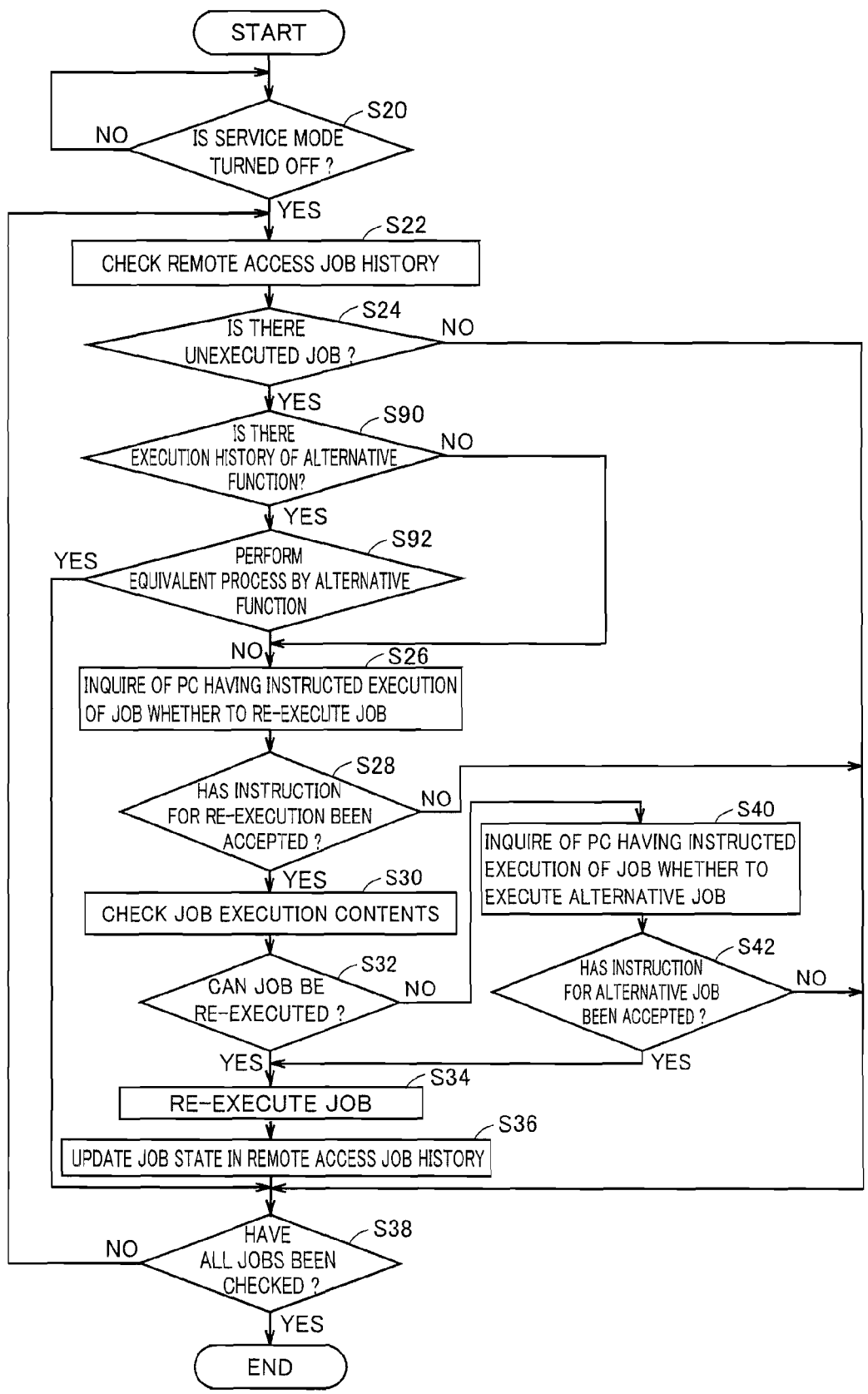
FIG. 19 is a flowchart illustrating job execution in the case where the service mode is turned off, according to the third embodiment of the present invention.

FIG. 19 is a flowchart illustrating job execution in the case where the service mode is turned off, according to the third embodiment of the present invention.

Referring to FIG. 19, it is determined whether the service mode is turned off (step S20).

Specifically, CPU 10 determines whether MFP 20 is switched from the service mode to the normal mode after completion of the maintenance operation by the serviceman.

CPU 10 then checks the remote access job history (step S22).

CPU 10 then determines whether there is an unexecuted job (step S24).

Specifically, CPU 10 determines whether the list of the remote access job history includes an unexecuted job having the job history in which the job state is designated as "acceptance rejected" and the factor is designated as "service mode". In addition, when the factor is designated not as "service mode" but as "error", there is a possibility that the job could not be normally accepted. This job is not counted as an unexecuted job.

When determining that there is an unexecuted job (YES in step S24), CPU 10 determines whether there is an execution history of the alternative function (step S90).

Specifically, CPU 10 determines whether the list of the remote access job history includes a job having the job history in which the job state is designated as "alternative process".

When determining that there is an execution history of the alternative function (YES in step S90), CPU 10 determines whether an equivalent job process has been performed by the alternative function (step S92).

Specifically, CPU 10 checks the contents of the alternative process in the job history in which the job state is designated as "alternative process" in the list of the remote access job history, to determine whether an equivalent process has been performed by the alternative function. In the present embodiment, the determination is made based on whether the function indicated by "@" has been performed or not.

When determining in step S92 that the equivalent process has been performed by the alternative function (YES in step S92), CPU 10 proceeds to step S38 without re-executing the job.

On the other hand, when CPU 10 determines in step S92 that the equivalent process has not been performed by the alternative function (NO in step S92), the process proceeds to step S26. Specifically, CPU 10 checks the contents of the alternative process in the job history showing the job state designated as "alternative process" in the list of the remote access job history, and, when the function not indicated by "@" has been performed, determines that the equivalent process has not been performed.

CPU 10 then inquires of the PC instructing execution of the job whether to re-execute the job (step S26).

Specifically, CPU 10 outputs information used for determining whether to re-execute the job to the PC having PC identification (address) stored in the remote access job history via network card 12. In the present embodiment, PC 100 is notified of the information by way of example.

PC 100 having received the information displays a re-execution notification screen on display 206.

Figure 20:
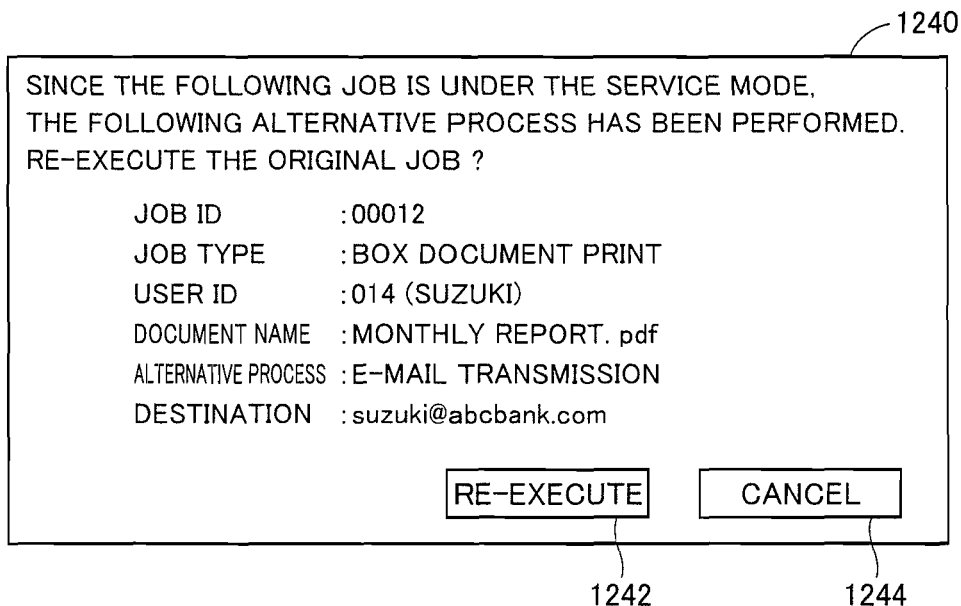
FIG. 20 is a diagram illustrating a re-execution notification screen 1240 displayed on display 206 of PC 100 according to the third embodiment.

FIG. 20 is a diagram illustrating a re-execution notification screen 1240 displayed on display 206 of PC 100 according to the third embodiment.

Referring to FIG. 20, re-execution notification screen 1240 displays a message saying that "Since the following job is under the service mode, the following alternative process has been performed. Re-execute the original job ?", and also displays a job ID as "00012", a job type as "box document print", a user ID as "014 (Suzuki)", and a document name as "monthly report.pdf". It also shows an alternative process as "e-mail transmission" and an address as "suzuki@abcbank.com".

The figure also shows a "re-execute" button 1242 for instructing re-execution and a "cancel" button 1244 for canceling re-execution.

The user checks the re-execution notification screen displayed on display 206 of PC 100, to designate "re-execute" button 1242 or "cancel" button 1244, for example, by a mouse or the like which is a pointing device serving as an input unit.

PC 100 outputs a re-execution instruction to MFP 20 in accordance with the user's designation.

The above-described notification screen can eliminate the need for the user to start the operation again from the beginning in order to re-execute the job request, which allows simplification in providing an instruction for re-execution.

Furthermore, in the case where the alternative process has already been performed to eliminate the need to re-execute the job, the alternative function is used to designate "cancel" button 1244 to allow cancellation of re-execution of the job. This allows elimination of unnecessary process to thereby provide greater convenience for the user.

Referring back to FIG. 19, when CPU 10 determines in step S90 that there is no execution history of the alternative function, the process proceeds to step S26. In this case, the re-execution notification screen similar to that described in FIG. 8 is displayed.

CPU 10 then determines whether an instruction for re-execution has been accepted (step S28). Specifically, CPU 10 determines whether an instruction for re-execution has been provided through network card 12 from CPU 10.

When determining that an instruction for re-execution has been accepted, CPU 10 checks the contents of job execution (step S30). Specifically, CPU 10 checks the job type of the unexecuted job included in the list of the remote access job history.

CPU 10 then determines whether the job can be re-executed (step S32).

When determining that the job can be re-executed (YES in step S32), CPU 10 re-executes the job (step S34). For example, in the above-described embodiment, when an instruction is given to re-execute the job having a job ID designated as "00012", a job type designated as "print", a user ID designated as "014", and a document name designated as "monthly report.pdf", the process of printing "monthly report.pdf" is performed.

CPU 10 then updates the job state in the remote access job history (step S36).

Specifically, CPU 10 updates the job state in the remote access job history to "normally ended".

CPU 10 then determines whether all jobs have been checked in the list of the remote access job history (step S38).

When CPU 10 determines that all jobs have been checked in the list of the remote access job history (YES in step S38), the process ends (end).

On the other hand, when CPU 10 determines that all jobs have not been checked in the list of the remote access job history (NO in step S38), the process is returned to step S22.

Furthermore, when CPU 10 determines that there is no unexecuted job (NO in step S24), the process proceeds to step S38.

Furthermore, when CPU 10 determines that an instruction to re-execute the job has not been accepted (NO in step S28), the process proceeds to step S38. The subsequent processes are the same as described above.

Furthermore, in step S32, when determining that the job cannot be re-executed (NO in step S32), CPU 10 inquires of the PC providing an instruction to execute the job about an alternative job request (step S40).

Specifically, CPU 10 outputs the information used for determining whether to execute the alternative job to the PC having PC identification (address) stored in the remote access job history through network card 12. In the present embodiment, PC 100 is notified of the information by way of example. In this case, the re-execution notification screen similar to that described in FIG. 9 is displayed.

It may be considered that the case where the unexecuted job cannot be re-executed after the service mode is turned off includes the case where, for example, the address book and the like having the transmission destination and the like of the data recorded therein is updated by the maintenance operation in the service mode.

CPU 10 determines whether an instruction for an alternative job has been accepted (step S42).

In step S42, when determining that an instruction for an alternative job has been accepted (YES in step S42), CPU 10 re-executes the job (step S34). For example, in the above-described embodiment, when an instruction is given to re-execute the job having a job ID designated as "00023", a job type designated as "facsimile transmission", a user ID designated as "014", and a document name designated as "estimate.pdf", CPU 10 performs the process of facsimile transmission of "estimate.pdf" to the destination designated by the alternative job through facsimile modem 14.

On the other hand, when CPU 10 determines in step S42 that an instruction for an alternative job has not been accepted (NO in step S42), the process proceeds to step S38.

In accordance with the structure according to the third embodiment of the present invention, when the equivalent process is performed by the alternative function, re-execution of the job is not required to be inquired, which allows improved convenience for the user. Furthermore, when the equivalent process is not performed by the alternative function, the notification screen regarding re-execution is displayed on display 206 of PC 100, which eliminates the need for the user to start the operation again from the beginning in order to re-execute the job request, to thereby allow simplification in providing an instruction for re-execution.

Furthermore, in the case where the unexecuted job cannot be re-executed, the alternative job request notification screen showing the destination and the like is displayed on display 206 of PC 100. This allows the user to readily re-execute the job request by again entering the destination and the like, to thereby allow the user to provide an instruction for re-execution in a simple manner without having to start the operation again from the beginning.

Furthermore, in the case where re-execution of the job is not required, the notification screen regarding re-execution of the unexecuted job or the alternative job request notification screen is displayed on display 206 of PC 100 to designate the "cancel" button, to thereby allow cancellation of re-execution of the job. This also allows elimination of unnecessary process to thereby provide improved convenience for the user.

[Modification of Third Embodiment]

The structure for inquiring about re-execution of the job has been described in the above-described embodiments. If it is possible to implement the setting so as to allow automatic execution of the job after the service mode is turned off, greater convenience for the user may be provided.

Figure 21:
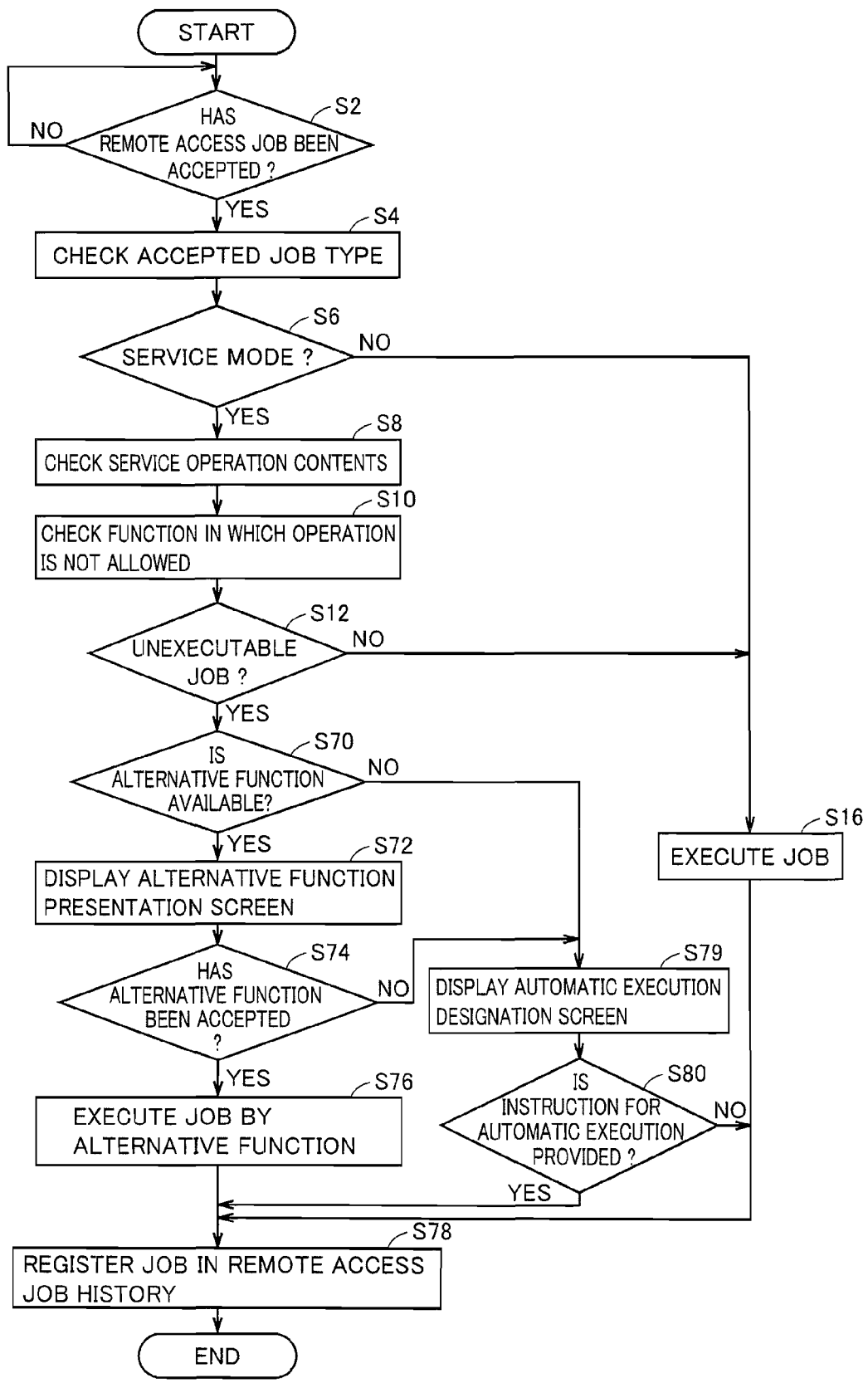
FIG. 21 is a flowchart illustrating the process in the case where the remote access job is accepted, according to the modification of the third embodiment of the present invention.

FIG. 21 is a flowchart illustrating the process in the case where the remote access job is accepted, according to the modification of the third embodiment of the present invention.

Referring to FIG. 21, the flow of the process according to the modification of the third embodiment of the present invention in the case where the remote access job has been accepted is the same as the flow in FIG. 15 except that, when it is determined in step S70 that the alternative function is not available (NO in step S70) or it is determined in step S74 that the alternative function has not been accepted (NO in step S74), the process proceeds to step S79.

In step S79, CPU 10 displays an automatic execution notification screen on display 206 of PC 100 (step S79).

Figure 22:
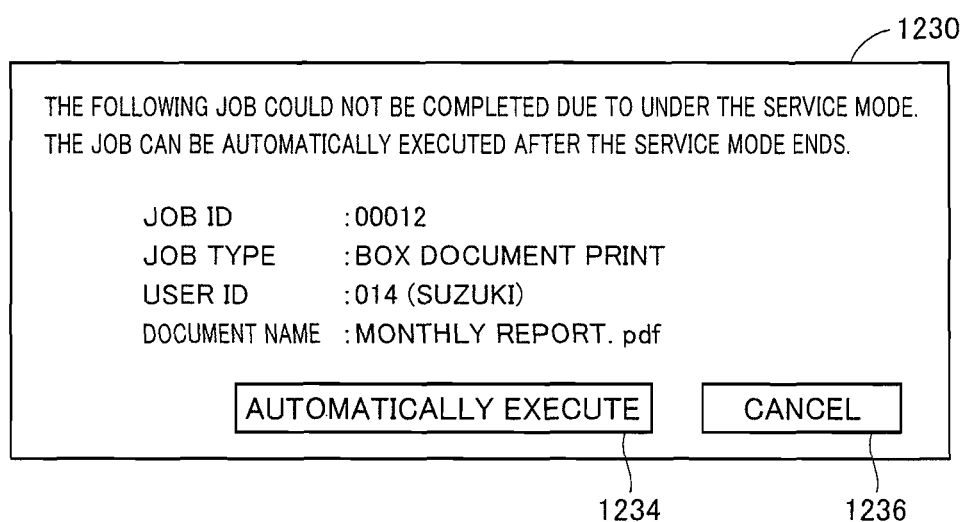
FIG. 22 is a diagram illustrating an automatic execution notification screen 1230 displayed on display 206 of PC 100.

FIG. 22 is a diagram illustrating an automatic execution notification screen 1230 displayed on display 206 of PC 100.

Referring to FIG. 22, automatic execution notification screen 1230 displays a message saying that "The following job could not be completed due to under the service mode. The job can be automatically executed after the service mode ends", and also displays a job ID as "00012", a job type as "box document print", a user ID as "014 (Suzuki)", and a document name as "monthly report.pdf".

The figure also shows an "automatically execute" button 1234 for instructing automatic execution and a "cancel" button 1236 for canceling execution.

The user checks the automatic execution notification screen displayed on display 206 of PC 100, to designate "automatically execute" button 1234 or "cancel" button 1236, for example, by a mouse or the like which is a pointing device serving as an input unit.

PC 100 outputs an automatic execution instruction to MFP 20 in accordance with the user's designation.

The above-described automatic execution notification screen can eliminate the need for the user to start the operation again from the beginning in order to re-execute the job request, which allows simplification in providing an instruction for re-execution.

Referring back to FIG. 21, CPU 10 determines whether an instruction for automatic execution has been accepted (step S80). Specifically, CPU 10 determines whether an instruction for automatic execution has been accepted from PC 100 through network card 12.

In step S80, when CPU 10 determines that an instruction for automatic execution has been accepted (YES in step S80), the process proceeds to step S78.

Then, in step S78, CPU 10 registers a job state as "automatically restart" in the remote access job history.

The process then ends (end). Since other processes are the same as those described in FIG. 15, the detailed description thereof will not be repeated.

FIG. 23 is a diagram illustrating a list of the remote access job history according to the modification of the third embodiment of the present invention.

The list of the history in FIG. 23 is the same as that in FIG. 18 except for the job ID designated as "00012" in which the alternative process is not performed and the job state is designated as "automatically restart".

Figure 24:
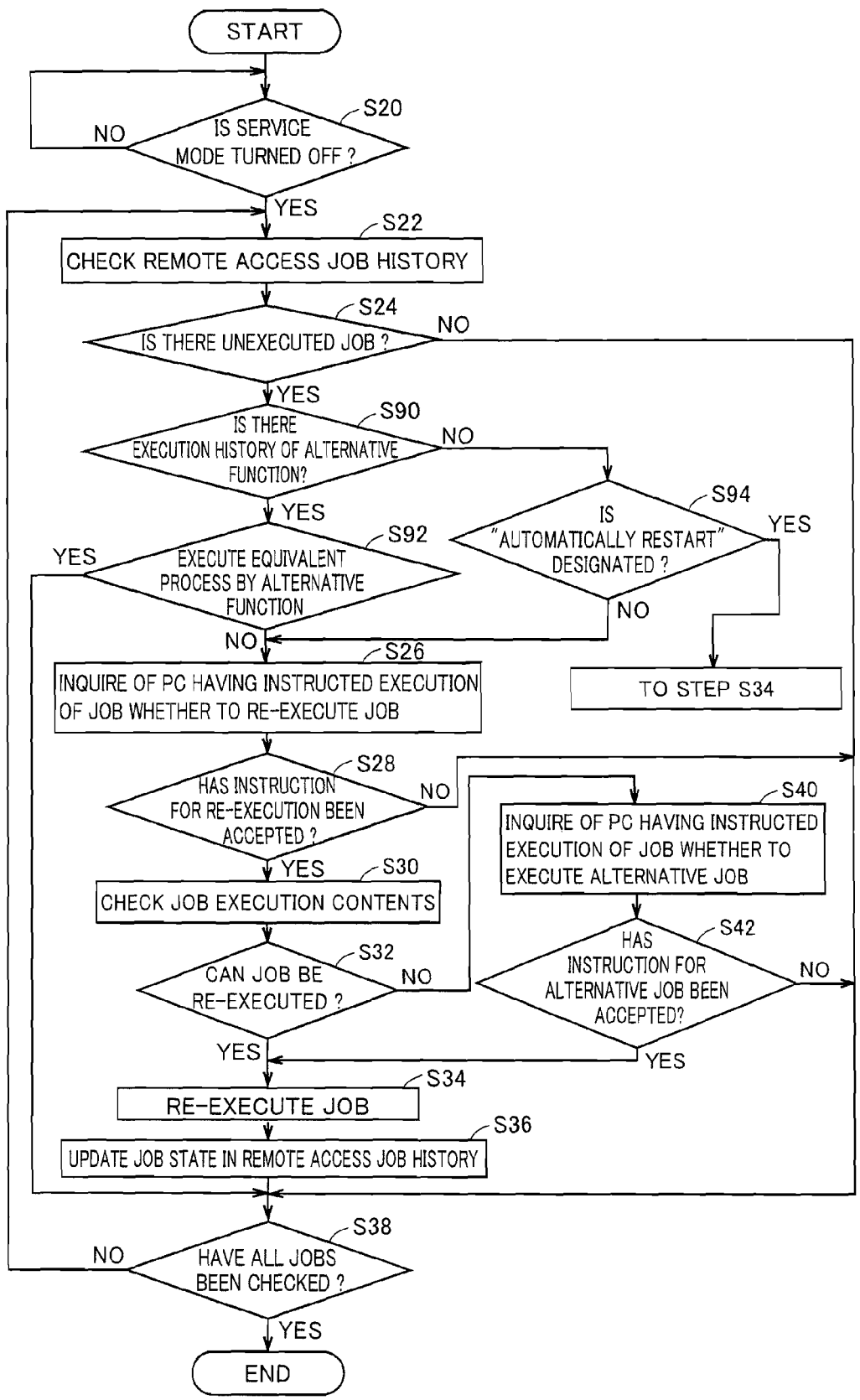
FIG. 24 is a flowchart illustrating job execution in the case where the service mode is turned off, according to the modification of the third embodiment of the present invention.

FIG. 24 is a flowchart illustrating job execution in the case where the service mode is turned off, according to the modification of the third embodiment of the present invention.

The flowchart in FIG. 24 is different from that in FIG. 19 in that the process of step S94 is additionally provided.

Specifically, when CPU 10 determines that there is no execution history of the alternative function (NO in step S90), the process proceeds to step S94.

CPU 10 then determines whether "automatically restart" is designated (step S94).

Specifically, CPU 10 determines whether there is a job history presenting a job state designated as "automatically restart" in the list of the remote access job history.

When CPU 10 determines that "automatically restart" is designated as a job state, the process proceeds to step S34 to re-executes the job as described above. For example, in the above-described embodiment, when an instruction is given to automatically restart the job having a job ID designated as "00012", a job type designated as "print", a user ID designated as "014", and a document name designated as "monthly report.pdf", CPU 10 performs the process of printing "monthly report.pdf".

On the other hand, when CPU 10 determines that "automatically restart" is not designated (NO in step S94), the process proceeds to step S26. The subsequent processes are the same as those described in FIG. 19.

The structure according to the modification of the third embodiment of the present invention allows designation of automatic restart after the service mode is turned off in the case where the remote access job cannot be executed in the service mode. This structure also allows re-execution of the job without having to display the notification screen regarding re-execution, which provides improved convenience for the user.

In addition, although the description has been made in the present embodiments with regard to the process in the case where, during the maintenance operation, the remote access job has been accepted under the service mode in which use of at least one function of a plurality of functions are inhibited, the present invention may also be applicable to the case where the remote access job has been accepted not only in the service mode but also in a different mode in which at least one function of a plurality of executable functions is inhibited from being used.

Furthermore, in each embodiment as described above, when the job state is designated as "acceptance rejected" and the factor is designated as "error", the job is not counted as an unexecuted job. However, the present invention is applicable to the following case even when the factor is designated as "error".

When a certain error occurs, the function having the error occurring is inhibited from being used. When the job is accepted in the case where the error occurs, the job is subjected to the process in the procedure similar to that described with reference to FIG. 4 and the like. In other words, when the job corresponds to a job executed by using the function inhibited from being used due to the error, the factor is registered as "error" in the remote access job history. Then, the job can be caused to be re-executed through the procedure similar to that in the operation shown in FIG. 7 and the like when the error is eliminated.

Alternatively, the alternative process of the job can be performed. In addition, there may be a case where the job having an error occurring during execution thereof or the job causing an error cannot be normally executed even when the error is eliminated. Accordingly, it may also be possible to inquire of the user to that effect, or to prevent the job causing the error form being re-executed.

Furthermore, the program causing the computer to function and execute control as described in the above flow may also be provided. This program may be recorded in a computer readable recording medium such as a flexible disk, a CD-ROM (Compact Disk-Read Only Memory), a ROM (Read Only Memory), a RAM (Random Access Memory), and a memory card included with a computer, and may be provided as a program product. Alternatively, the program may be provided as recorded in a recording medium such as a hard disk incorporated in the computer. The program may also be provided by downloading through a network.

The program may invoke a necessary module from among program modules provided as a part of the operation system (OS) of the computer at prescribed timing in prescribed sequences and cause the module to perform processing. In this case, the program itself does not include the above-described module but cooperates with the OS to execute processing. The program not including the above-described module may also be included in the program according to the present invention.

Furthermore, the program according to the present invention may be provided as incorporated as a part of another program. Also in this case, the program itself does not include any module included in another program described above, but cooperates with another program to execute processing. The program incorporated in another program may also be included in the program according to the present invention.

The provided program product is installed in a program storage unit such as a hard disk for execution. It is to be noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus communicatively connected to an external terminal, comprising:
   a communication device for transmitting and receiving data to and from said external terminal;
   a controller capable of providing an instruction to execute at least one function of a plurality of functions which are executable in said image forming apparatus, said at least one function having been designated in job information from said external terminal received in said communication device; and
   a memory storing the job information from said external terminal received in said communication device,
   said controller being configured to
      inhibit use of at least one function of the plurality of functions which are executable in said image forming apparatus in accordance with an instruction,
      check contents of the job information received from said external terminal,
      determine based on the checked job information whether the function inhibited from being used is designated, and,
      output information used for determining whether to re-execute the function inhibited from being used which is designated in said job information, upon termination of a state where the function is inhibited from being used, when determining that the function inhibited from being used is designated.

2. The image forming apparatus according to claim 1, wherein said controller is configured to output, to said external terminal transmitting said job information through said communication device, the information used for determining whether to re-execute the function inhibited from being used which is designated in said job information.

3. The image forming apparatus according to claim 2, wherein
   said controller is configured to
   when determining that said function inhibited from being used is designated, determine whether a function not inhibited from being used can be applied as an alternative to said function inhibited from being used, and
   when determining that the function not inhibited from being used can be applied as an alternative to said function inhibited from being used, output, to said external terminal transmitting said job information through said communication device, information used for determining whether to execute an alternative function not inhibited from being used.

4. The image forming apparatus according to claim 3, wherein
   said controller is configured to
   determine whether an instruction to execute said alternative function has been accepted, said instruction having been transmitted from said external terminal through said communication device,
   instruct execution of said alternative function when the instruction to execute said alternative function has been accepted, and,
   when execution of said alternative function is instructed, store information that said alternative function has been executed as history information in said memory.

5. The image forming apparatus according to claim 4, wherein
   said controller is configured to
   determine whether said history information stored in said memory includes the information that said alternative function has been executed, upon termination of the state where the function is inhibited from being used, and
   in accordance with a determination result, output the information used for determining whether to re-execute the function inhibited from being used which is designated in said job information.

6. The image forming apparatus according to claim 1, wherein
   the job information from said external terminal includes user information about a user transmitted from said external terminal,
   said image forming apparatus includes
      a display for displaying information, and
      an authentication unit for performing a user authentication process in accordance with an instruction, and
   said controller is configured to
      determine whether the user authentication process in said authentication unit is performed, upon termination of the state where the function is inhibited from being used,
      in accordance with a determination result, extract said job information designating the function inhibited from being used, said job information being stored in said memory and including the user information about the user for whom the user authentication process is performed, and
      output, to said display, the information used for determining whether to re-execute the function inhibited from being used which is designated in the extracted job information.

7. The image forming apparatus according to claim 6, wherein
   said controller is configured to
   determine whether an instruction to re-execute the function inhibited from being used has been accepted in a screen displayed on the display based on the information used for determining whether to re-execute the function inhibited from being used which is designated in the extracted job information,
   when the instruction to re-execute the function inhibited from being used has been accepted, determine whether the function inhibited from being used which is designated in the extracted job information can be re-executed, and,
   when determining that the function inhibited from being used which is designated in the extracted job information cannot be re-executed, output the information used for determining an alternative process to said display.

8. A method for controlling an image forming apparatus communicatively connected to an external terminal, said image forming apparatus including a communication device for transmitting and receiving data to and from said external terminal; a controller capable of providing an instruction to execute at least one function of a plurality of functions which are executable, said at least one function having been designated in job information from said external terminal received in said communication device; and a memory storing the job information from said external terminal received in said communication device, the method comprising the steps of:
   inhibiting use of at least one function of the plurality of functions which are executable in said image forming apparatus in accordance with an instruction;
   checking contents of the job information received from said external terminal;
   determining based on the checked job information whether a function inhibited from being used is designated; and, outputting information used for determining whether to re-execute the function inhibited from being used which is designated in said job information, upon termination of a state where the function is inhibited from being used, when determining that the function inhibited from being used is designated.

9. A non-transitory computer recording medium recording a control program executed by a computer of an image forming apparatus communicatively connected to an external terminal, said image forming apparatus including a communication device for transmitting and receiving data to and from said external terminal; a controller capable of providing an instruction to execute at least one function of a plurality of functions which are executable, said at least one function having been designated in job information from said external terminal received in said communication device; and a memory storing the job information from said external terminal received in said communication device, said control program causing said computer to perform the steps of:

inhibiting use of at least one function of the plurality of functions which are executable in said image forming apparatus in accordance with an instruction;

checking contents of the job information received from said external terminal;

determining based on the checked job information whether a function inhibited from being used is designated; and, outputting information used for determining whether to re-execute the function inhibited from being used which is designated in said job information, upon termination of a state where the function is inhibited from being used, when determining that the function inhibited from being used is designated.

\* \* \* \* \*